United States Patent
Wang et al.

(10) Patent No.: US 11,647,408 B2
(45) Date of Patent: May 9, 2023

(54) TECHNIQUES FOR DYNAMICALLY UPDATING A SEARCH SPACE OF A SIDELINK CONTROL CHANNEL

(71) Applicant: QUALCOMM Incorporated, San Diego, CA (US)

(72) Inventors: Xiaojie Wang, Hillsborough, NJ (US); Jing Sun, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 17/124,099

(22) Filed: Dec. 16, 2020

(65) Prior Publication Data

US 2022/0191718 A1 Jun. 16, 2022

(51) Int. Cl.
*H04W 24/08* (2009.01)
*H04B 17/336* (2015.01)
(Continued)

(52) U.S. Cl.
CPC .......... *H04W 24/08* (2013.01); *H04B 17/336* (2015.01); *H04L 1/0038* (2013.01);
(Continued)

(58) Field of Classification Search
CPC . H04W 24/08; H04W 24/10; H04W 72/0406; H04W 72/0446; H04W 72/0453;
(Continued)

(56) References Cited

U.S. PATENT DOCUMENTS 11,558,892 B2 * 1/2023 Miao .................... H04W 72/23
2017/0331670 A1 * 11/2017 Parkvall .............. H04L 41/0816
(Continued)

FOREIGN PATENT DOCUMENTS

| EP | 3363137 | A1 |   | 8/2018 |           |
|----|---------|----|---|--------|-----------|
| EP | 3363137 | B1 | * | 1/2021 | H04L 5/0053 |
| EP | 4013182 | A1 | * | 6/2022 | H04W 28/24 |

(Continued)

OTHER PUBLICATIONS

L. -H. Nguyen, V. -L. Nguyen and J. -J. Kuo, "Efficient Reinforcement Learning-Based Transmission Control for Mitigating Channel Congestion in 5G V2X Sidelink," in IEEE Access, vol. 10, pp. 62268-62281, 2022, doi: 10.1109/ACCESS.2022.3182021. (Year: 2022).*

International Search Report and Written Opinion—PCT/US2021/056666—ISA/EPO—dated Feb. 28, 2022 (2100632WO).

(Continued)

*Primary Examiner* — Thai D Hoang
(74) *Attorney, Agent, or Firm* — Holland & Hart LLP

(57) ABSTRACT

Methods, systems, and devices for wireless communications are described. In some systems, a first user equipment (UE) may monitor and perform blind decoding for a sidelink transmission, such as a first part of sidelink control information (SCI), from a second UE over a configured search space. The first UE may receive signaling indicating an update to the search space via lower layer signaling, such as via a second part of SCI or a sidelink data channel, and may monitor for the sidelink transmission over the updated search space. The update to the search space may indicate a blocking of one or more monitoring occasions from the configured search space, an addition of one or more monitoring occasions to the configured search space, a reactivation of one or more previously blocked monitoring occasions, or a switching from a first search space to a second search space.

30 Claims, 14 Drawing Sheets

(51) Int. Cl.
   H04L 1/00 (2006.01)
   H04L 5/00 (2006.01)
   H04W 24/10 (2009.01)
   H04W 72/0446 (2023.01)
   H04W 72/0453 (2023.01)
   H04W 72/20 (2023.01)

(52) U.S. Cl.
   CPC .......... H04L 5/0055 (2013.01); H04W 24/10 (2013.01); H04W 72/0446 (2013.01); H04W 72/0453 (2013.01); H04W 72/20 (2023.01)

(58) Field of Classification Search
   CPC ... H04B 17/336; H04L 1/0038; H04L 5/0055; H04L 5/0062; H04L 5/0094; H04L 5/0053
   See application file for complete search history.

(56) References Cited

U.S. PATENT DOCUMENTS

| | | | | |
|---|---|---|---|---|
| 2018/0139724 | A1* | 5/2018 | Loehr | H04W 72/02 |
| 2019/0305867 | A1* | 10/2019 | Tseng | H04W 72/042 |
| 2020/0221431 | A1 | 7/2020 | Hosseini et al. | |
| 2021/0058905 | A1* | 2/2021 | Ganesan | H04L 5/14 |
| 2021/0250118 | A1* | 8/2021 | Roth-Man | H04W 72/10 |
| 2021/0297199 | A1* | 9/2021 | Miao | H04L 1/1896 |
| 2021/0297221 | A1* | 9/2021 | Lee | H04L 5/0055 |
| 2022/0104158 | A1* | 3/2022 | Liu | H04W 74/0866 |
| 2022/0191718 | A1* | 6/2022 | Wang | H04W 24/10 |

FOREIGN PATENT DOCUMENTS

| | | | | |
|---|---|---|---|---|
| GB | 2597807 A * | 2/2022 | | H04L 5/003 |
| WO | WO-2013109100 A1 * | 7/2013 | | H04L 5/0053 |
| WO | WO-2016126142 A1 * | 8/2016 | | H04J 11/0086 |
| WO | WO-2020033088 A1 * | 2/2020 | | H04B 17/318 |
| WO | WO-2020033719 A1 | 2/2020 | | |
| WO | WO-2021067583 A2 * | 4/2021 | | H04L 5/0037 |

OTHER PUBLICATIONS

Lenovo, et al., "PDCCH Monitoring at Reduced Capability UE", 3GPP Draft, 3GPP TSG RAN WG1 Meeting #102-e, R1-2005933, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), XP051917826, 5 Pages, Retrieved from the Internet: URL: https://ftp.3gpp.org/tsg_ran/WG1_RL1/TSGR1_102-e/Docs/R1-2005933.zip R1-2005933 PDCCH Monitoring Reduced Cap UE.docx [Retrieved on Aug. 8, 2020] p. 3.

* cited by examiner

TECHNIQUES FOR DYNAMICALLY UPDATING A SEARCH SPACE OF A SIDELINK CONTROL CHANNEL

FIELD OF TECHNOLOGY

The following relates to wireless communications, including techniques for dynamically updating a search space of a sidelink control channel.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, multiple UEs may communicate with each other via a sidelink.

SUMMARY

The described techniques relate to improved methods, systems, devices, and apparatuses that support techniques for dynamically updating a search space of a sidelink control channel. For example, a first user equipment (UE) may receive (e.g., via radio resource control (RRC) signaling) a configuration of a search space which the first UE may monitor for a sidelink transmission, such as sidelink control information (SCI), from a second UE. The first UE may receive the configuration of the search space from a serving base station or from the second UE, and the configured search space may include a first set of time and frequency resources (which may be referred to herein as monitoring occasions). In some implementations of the present disclosure, the first UE may receive signaling from the second UE indicating an update to the configured search space. Such an update to the configured search space may include a blocking of some resources from the first set of time and frequency resources, an addition of some resources to the first set of time and frequency resources, a reactivation of some resources (e.g., that were previously blocked), or a switching from the first set of time and frequency resources to a second set of time and frequency resources, among other examples.

The first UE may receive the signaling indicating the update to the search space via SCI, such as a second part of SCI (which may be referred to herein as SCI-2), or over a sidelink data channel, such as a physical sidelink shared channel (PSSCH). In some examples, in addition to indicating the update to the search space, the signaling may indicate (either explicitly or implicitly) a timer that defines a duration for the update to the search space or an offset indicating a time to apply the update to the search space, or both. As such, the first UE may apply the update to the search space (e.g., for the duration of the timer or based on the offset, or both) and may monitor over the updated search space for sidelink transmissions from the second UE. Likewise, the second UE may transmit sidelink transmissions to the first UE over the updated search space while the update to the search space is in effect (or valid).

A method for wireless communication at a first user equipment (UE) is described. The method may include receiving a configuration of a search space for the first UE including a first set of multiple monitoring occasions of a sidelink control channel, receiving, from a second UE, signaling indicating an update to the search space, the update associated with one or more monitoring occasions of the sidelink control channel, monitoring a second set of multiple monitoring occasions of the sidelink control channel based on the configuration of the search space and the update to the search space, and receiving a first part of SCI based on the monitoring.

An apparatus for wireless communication at a first UE is described. The apparatus may include a processor, memory coupled with the processor, and instructions stored in the memory. The instructions may be executable by the processor to cause the apparatus to receive a configuration of a search space for the first UE including a first set of multiple monitoring occasions of a sidelink control channel, receive, from a second UE, signaling indicating an update to the search space, the update associated with one or more monitoring occasions of the sidelink control channel, monitor a second set of multiple monitoring occasions of the sidelink control channel based on the configuration of the search space and the update to the search space, and receive a first part of SCI based on the monitoring.

Another apparatus for wireless communication at a first UE is described. The apparatus may include means for receiving a configuration of a search space for the first UE including a first set of multiple monitoring occasions of a sidelink control channel, means for receiving, from a second UE, signaling indicating an update to the search space, the update associated with one or more monitoring occasions of the sidelink control channel, means for monitoring a second set of multiple monitoring occasions of the sidelink control channel based on the configuration of the search space and the update to the search space, and means for receiving a first part of SCI based on the monitoring.

A non-transitory computer-readable medium storing code for wireless communication at a first UE is described. The code may include instructions executable by a processor to receive a configuration of a search space for the first UE including a first set of multiple monitoring occasions of a sidelink control channel, receive, from a second UE, signaling indicating an update to the search space, the update associated with one or more monitoring occasions of the sidelink control channel, monitor a second set of multiple monitoring occasions of the sidelink control channel based on the configuration of the search space and the update to the search space, and receive a first part of SCI based on the monitoring.

In some examples of the method, apparatuses, and non-transitory computer-readable medium described herein, receiving the signaling indicating the update to the search space may include operations, features, means, or instructions for receiving an indication of a blocking, from the search space, of the one or more monitoring occasions of the sidelink control channel, where the second set of multiple monitoring occasions includes a difference between the first set of multiple monitoring occasions and the one or more monitoring occasions.

In some examples of the method, apparatuses, and non-transitory computer-readable medium described herein, receiving the signaling indicating the update to the search space may include operations, features, means, or instructions for receiving an indication of an addition, to the search space, of the one or more monitoring occasions of the sidelink control channel, where the second set of multiple monitoring occasions includes a sum of the first set of multiple monitoring occasions and the one or more monitoring occasions.

In some examples of the method, apparatuses, and non-transitory computer-readable medium described herein, receiving the signaling indicating the update to the search space may include operations, features, means, or instructions for receiving an indication of a reactivation of the one or more monitoring occasions of the sidelink control channel, where the second set of multiple monitoring occasions includes at least the one or more monitoring occasions.

In some examples of the method, apparatuses, and non-transitory computer-readable medium described herein, the first UE is configured with a set of search spaces including at least two search spaces, where receiving the configuration of the search space includes receiving a first indication of a first search space of the set of search spaces and receiving the signaling indicating the update to the search space includes receiving a second indication of a switch from the first search space to a second search space of the set of search spaces.

In some examples of the method, apparatuses, and non-transitory computer-readable medium described herein, the first search space may be associated with a first monitoring occasion blocking pattern and the second search space may be associated with a second monitoring occasion blocking pattern.

In some examples of the method, apparatuses, and non-transitory computer-readable medium described herein, receiving the signaling indicating the update to the search space may include operations, features, means, or instructions for receiving a timer indicating a suspension of the update to the search space, where the update to the search space may be valid for a duration of the timer and invalid upon expiration of the timer.

In some examples of the method, apparatuses, and non-transitory computer-readable medium described herein, receiving the signaling indicating the update to the search space may include operations, features, means, or instructions for receiving an offset indicating a time to apply the update to the search space.

Some examples of the method, apparatuses, and non-transitory computer-readable medium described herein may further include operations, features, means, or instructions for transmitting, to the second UE, an acknowledgement of the signaling indicating the update to the search space.

Some examples of the method, apparatuses, and non-transitory computer-readable medium described herein may further include operations, features, means, or instructions for measuring a channel quality of the sidelink control channel and transmitting, to the second UE, a measurement report including an interference measurement value associated with the at least one of the first set of multiple monitoring occasions based on measuring the channel quality of the sidelink control channel, where the update to the search space may be based on the interference measurement value.

Some examples of the method, apparatuses, and non-transitory computer-readable medium described herein may further include operations, features, means, or instructions for receiving an indication of a threshold associated with transmission of the measurement report, where transmitting the measurement report including the interference measurement value associated with the at least one of the first set of multiple monitoring occasions may be based on the interference measurement value exceeding the threshold.

Some examples of the method, apparatuses, and non-transitory computer-readable medium described herein may further include operations, features, means, or instructions for receiving, from the second UE, a periodic transmission schedule for the measurement report, where transmitting the measurement report may be based on the periodic transmission schedule.

In some examples of the method, apparatuses, and non-transitory computer-readable medium described herein, the signaling indicating the update to the search space may be received via a second part of SCI or a sidelink data channel.

In some examples of the method, apparatuses, and non-transitory computer-readable medium described herein, the update to the search space applies to one or both of a forward link or a reverse link.

A method for wireless communication at a second UE is described. The method may include identifying a configuration of a search space for a first UE including a first set of multiple monitoring occasions of a sidelink control channel, transmitting, to the first UE, signaling indicating an update to the search space, the update associated with one or more monitoring occasions of the sidelink control channel, and transmitting, to the first UE, a first part of SCI over a subset of a second set of multiple monitoring occasions of the sidelink control channel based on the configuration of the search space and the update to the search space.

An apparatus for wireless communication at a second UE is described. The apparatus may include a processor, memory coupled with the processor, and instructions stored in the memory. The instructions may be executable by the processor to cause the apparatus to identify a configuration of a search space for a first UE including a first set of multiple monitoring occasions of a sidelink control channel, transmit, to the first UE, signaling indicating an update to the search space, the update associated with one or more monitoring occasions of the sidelink control channel, and transmit, to the first UE, a first part of SCI over a subset of a second set of multiple monitoring occasions of the sidelink control channel based on the configuration of the search space and the update to the search space.

Another apparatus for wireless communication at a second UE is described. The apparatus may include means for identifying a configuration of a search space for a first UE including a first set of multiple monitoring occasions of a sidelink control channel, means for transmitting, to the first UE, signaling indicating an update to the search space, the update associated with one or more monitoring occasions of the sidelink control channel, and means for transmitting, to the first UE, a first part of SCI over a subset of a second set of multiple monitoring occasions of the sidelink control channel based on the configuration of the search space and the update to the search space.

A non-transitory computer-readable medium storing code for wireless communication at a second UE is described. The code may include instructions executable by a processor to identify a configuration of a search space for a first UE including a first set of multiple monitoring occasions of a sidelink control channel, transmit, to the first UE, signaling indicating an update to the search space, the update associated with one or more monitoring occasions of the sidelink control channel, and transmit, to the first UE, a first part of SCI over a subset of a second set of multiple monitoring occasions of the sidelink control channel based on the configuration of the search space and the update to the search space.

In some examples of the method, apparatuses, and non-transitory computer-readable medium described herein, transmitting the signaling indicating the update to the search space may include operations, features, means, or instructions for transmitting an indication of a blocking, from the search space, of the one or more monitoring occasions of the sidelink control channel, where the second set of multiple monitoring occasions includes a difference between the first set of multiple monitoring occasions and the one or more monitoring occasions.

In some examples of the method, apparatuses, and non-transitory computer-readable medium described herein, transmitting the signaling indicating the update to the search space may include operations, features, means, or instructions for transmitting an indication of an addition, to the search space, of the one or more monitoring occasions of the sidelink control channel, where the second set of multiple monitoring occasions includes a sum of the first set of multiple monitoring occasions and the one or more monitoring occasions.

In some examples of the method, apparatuses, and non-transitory computer-readable medium described herein, transmitting the signaling indicating the update to the search space may include operations, features, means, or instructions for transmitting an indication of a reactivation of the one or more monitoring occasions of the sidelink control channel, where the second set of multiple monitoring occasions includes at least the one or more monitoring occasions.

In some examples of the method, apparatuses, and non-transitory computer-readable medium described herein, the method further includes transmitting, to the first UE, a first indication of a first search space of the set of search spaces and transmitting the signaling indicating the update to the search space includes transmitting a second indication of a switch from the first search space to a second search space of the set of search spaces.

In some examples of the method, apparatuses, and non-transitory computer-readable medium described herein, the first search space may be associated with a first monitoring occasion blocking pattern and the second search space may be associated with a second monitoring occasion blocking pattern.

In some examples of the method, apparatuses, and non-transitory computer-readable medium described herein, transmitting the signaling indicating the update to the search space may include operations, features, means, or instructions for transmitting a timer indicating a suspension of the update to the search space, where the update to the search space may be valid for a duration of the timer and invalid upon expiration of the timer.

In some examples of the method, apparatuses, and non-transitory computer-readable medium described herein, transmitting the signaling indicating the update to the search space may include operations, features, means, or instructions for transmitting an offset indicating a time to apply the update to the search space.

Some examples of the method, apparatuses, and non-transitory computer-readable medium described herein may further include operations, features, means, or instructions for receiving, from the first UE, an acknowledgement of the signaling indicating the update to the search space.

Some examples of the method, apparatuses, and non-transitory computer-readable medium described herein may further include operations, features, means, or instructions for receiving, from the first UE, a measurement report including an interference measurement value associated with at least one of the first set of multiple monitoring occasions, where the update to the search space may be based on the interference measurement value.

Some examples of the method, apparatuses, and non-transitory computer-readable medium described herein may further include operations, features, means, or instructions for transmitting an indication of a threshold associated with transmission of the measurement report, where receiving the measurement report including the interference measurement value associated with the at least one of the first set of multiple monitoring occasions may be based on the interference measurement value exceeding the threshold.

Some examples of the method, apparatuses, and non-transitory computer-readable medium described herein may further include operations, features, means, or instructions for transmitting, to the first UE, a periodic transmission schedule for the measurement report, where receiving the measurement report may be based on the periodic transmission schedule.

In some examples of the method, apparatuses, and non-transitory computer-readable medium described herein, the signaling indicating the update to the search space may be transmitted via a second part of SCI or a sidelink data channel.

In some examples of the method, apparatuses, and non-transitory computer-readable medium described herein, the update to the search space applies to one or both of a forward link or a reverse link.

DETAILED DESCRIPTION

Figure 1:
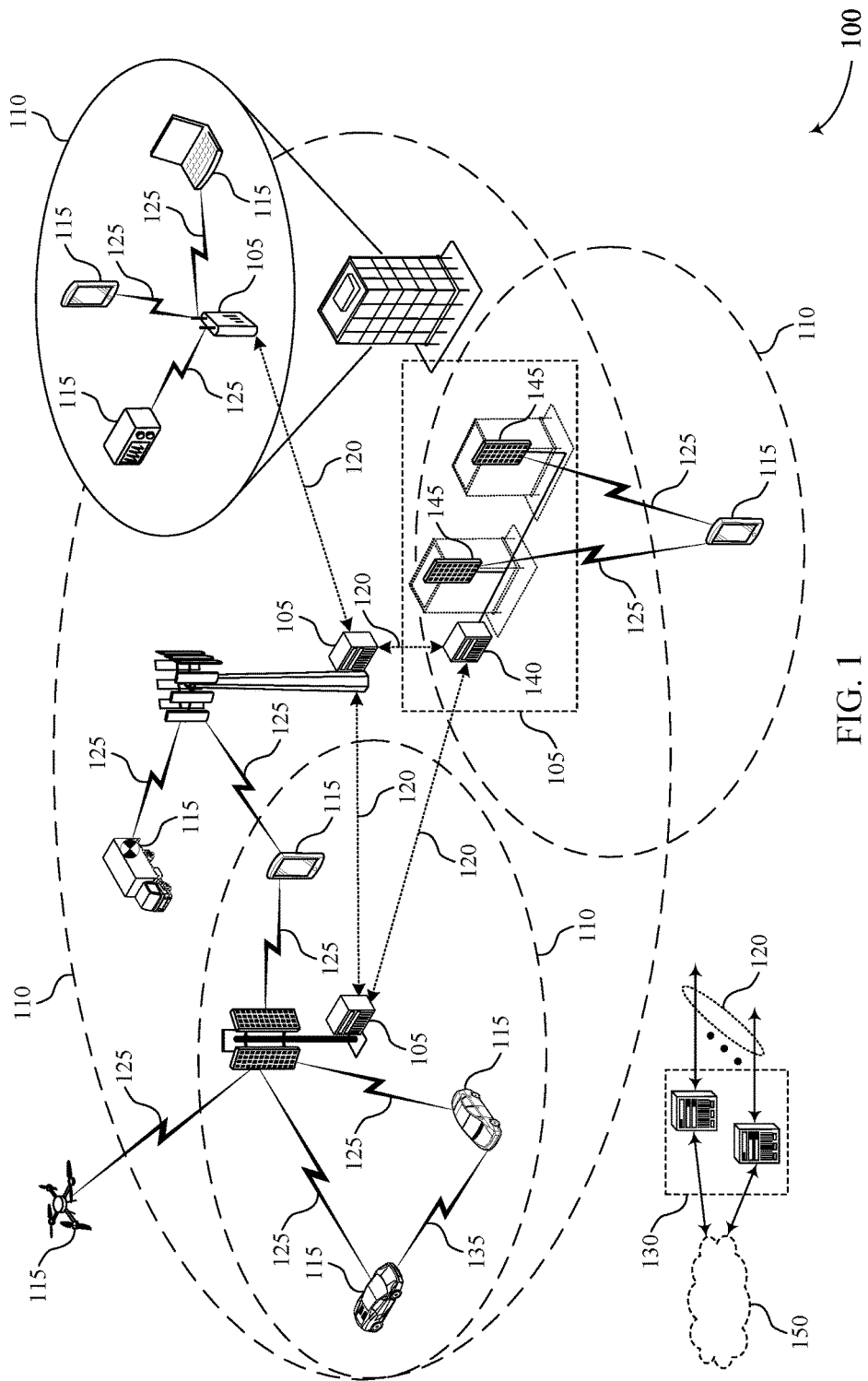
FIGS. 1 and 2 illustrate examples of wireless communications systems that support techniques for dynamically updating a search space of a sidelink control channel in accordance with aspects of the present disclosure.

When two communicating devices communicate with each other over a sidelink (such as in examples in which the two communicating devices are user equipment (UEs) capable of communicating via a peer-to-peer link), one of the two devices may monitor a resource pool for sidelink control information (SCI) from the other of the two devices and, in some deployments, such a resource pool may be relatively large. For example, in some industrial Internet of Things (IoT) scenarios, a size of the resource pool over which the two devices may monitor may increase such that blind decoding over an entirety of the search space is no longer feasible (e.g., based on a device capability). As such, the two devices may employ a search space including a subset of the resources in the resource pool. In examples in which the two devices employ such a search space, the two devices may receive or otherwise identify a configuration of the search space and may transmit and receive over the configured search space. Such configured search spaces may be configured in a semi-static manner, however, and may accordingly be updated relatively infrequently. This infrequent updating may result in the use of sub-optimal resources (e.g., resources experiencing high levels of interference or congestion).

In some implementations of the present disclosure, two sidelink devices may support signaling for dynamically updating the configured search space (e.g., without re-configuration of the search space). For example, the transmitting device (e.g., the device transmitting over the search space), may transmit an update to the search space to the receiving device and, accordingly, the transmitting device may transmit SCI over the updated search space and the receiving device may likewise monitor for the SCI over the updated search space. In some examples, the update to the search space may include a blocking of one or more subchannels from the configured search space (such that the receiving device refrains from monitoring over such blocked subchannels), an addition of one or more subchannels to the search space (such that the UE additionally monitors over such added subchannels), a reactivation of previously blocked subchannels, or a dynamic switching from one search space to a different search space (from a list of available or configured search spaces), among other examples.

In some examples, the transmitting device may transmit the update to the search space based on interference or congestion of some resources of the resource pool. For example, if one or more subchannels of the resource pool are reserved or otherwise used by other devices (e.g., for a relatively long period of time), the transmitting UE may block the one or more subchannels from the search space. Additionally or alternatively, if one or both of the transmitting device or the receiving device measure or otherwise determine that one or more subchannels are experiencing relatively high levels of interference, the transmitting device may block the one or more subchannels from the search space. For example, the receiving device may measure the sidelink channel between the two devices, obtain an interference measurement or value for at least a subset of the subchannels of the configured search space, and transmit a measurement report indicating the measured interference. In such examples, the transmitting device may determine the update to the search space based on the measured interference.

Particular aspects of the subject matter described in this disclosure can be implemented to realize one or more of the following potential advantages. The described techniques may be implemented to achieve more efficient power consumption or processing complexity, or both, at the receiving device via dynamic search space updates. For example, the described techniques may be implemented to reduce power consumption and processing complexity of the receiving device based on blocking one or more subchannels that are experiencing relatively high levels of interference or congestion, as the receiving device may refrain from performing blind decoding on any of the blocked subchannels. Further, based on blocking subchannels from the configured search space based on levels of interference or congestion, the receiving device may achieve such reductions in power consumption or processing complexity while experiencing an increase in the reliability of the SCI transmission, as the transmitting device will likewise refrain from transmitting the SCI over any of the blocked subchannels. As such, the two devices may experience an increase in a likelihood for successful communication of the SCI (as well as any communication scheduled by the SCI), which may improve spectral efficiency and result in increases to data rates and system capacity, among other benefits. Further, the described techniques may be implemented to add subchannels to the search space or to reactivate previously blocked subchannels, which may avoid complete re-configuration of the search space as the search space can be maintained over time via dynamic updates or modifications.

Aspects of the disclosure are initially described in the context of wireless communications systems. Additional aspects of the disclosure are illustrated by and described with reference to a resource pool, a reservation scheme, a slot configuration, and a process flow. Aspects of the disclosure are further illustrated by and described with reference to apparatus diagrams, system diagrams, and flowcharts that relate to techniques for dynamically updating a search space of a sidelink control channel.

FIG. 1 illustrates an example of a wireless communications system 100 that supports techniques for dynamically updating a search space of a sidelink control channel in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, two UEs 115 may communicate with each other via a communication link 135 (e.g., a sidelink). In such cases, for example, a first UE 115 may receive one or more sidelink transmissions from a second UE 115 over a sidelink channel, which may include one or both of a sidelink control channel or a sidelink data channel. For example, the first UE 115 may receive a first part of SCI (which may be referred to herein as SCI-1) over a sidelink control channel, such as a physical sidelink control channel (PSCCH), and a second part of SCI (which may be referred to herein as SCI-2) and data over a sidelink data channel, such as a physical sidelink shared channel (PSSCH).

In some deployment scenarios, such as in cellular V2X (C-V2X) deployments or in industrial IoT deployments, the first UE 115 and the second UE 115 may determine or otherwise identify a resource allocation for communications between the first UE 115 and the second UE 115 (which may be carried over a PC5 link) according to various modes. In a first mode, for example, a serving base station 105 may assign the transmission resources for sidelink communications between the first UE 115 and the second UE 115 through downlink control information (DCI), such as DCI 3_0. For example, in the first mode, the base station 105 may transmit, to at least one of the first UE 115 or the second UE 115, the DCI 3_0 indicating an allocation of time and frequency resources and a transmission timing. Further, in the first mode, the serving base station 105 may support dynamic grants or configured grants, including configured grants type 1 (which may be activated via RRC signaling from the base station 105) and configured grants type 2 (which may be provided by a downlink control channel and activated via layer 1 (L1) signaling). The second UE 115 may select a modulation and coding scheme (MCS) for a sidelink transmission within a limit (e.g., from a configured set or range of MCSs) set by the base station 105.

In a second mode, the second UE 115 (e.g., the transmitting UE 115), may autonomously (e.g., without signaling from the base station 105) select resources for sidelink communications between the first UE 115 and the second UE 115. Further, in the second mode, the second UE 115 may perform channel sensing based on blind decoding PSCCH channels (e.g., all PSCCH channels) to determine or otherwise identify which resources of the PSCCH are reserved by other sidelink transmissions. The second UE 115 may report which resources of the PSCCH are available (e.g., which resources of the sensed PSSCH are not reserved by other sidelink transmissions) to an upper layer and the upper layer may decide or otherwise determine resource usage for a sidelink transmission to the first UE 115.

The first UE 115 (e.g., the receiving UE 115) may behave similarly or the same in both the first mode and the second mode. For example, in either the first mode or the second mode, the first UE 115 may perform blind decoding in each (e.g., every) subchannel of a sidelink resource pool to find the SCI-1 carried over the PSCCH. Such a resource pool may include a number of subchannels over a number of slots and may be shared among a number of UEs 115. Resource management of the resource pool may either be performed at the base station 105 (in examples in which the devices communicate in the first mode) or the second UE 115 may autonomously select available resources from the release pool (in examples in which the devices communicate in the second mode).

In some aspects, the resource pool may include between 1 and 27 subchannels. As such, the first UE 115 may be capable of performing blind decoding over the entirety of the resource pool. For example, the first UE 115 may have a blind decoding limit associated with a capability of the UE 115 such that blind decoding any number of subchannels between 1 and 27 is within the blind decoding limit of the first UE 115. In some deployment scenarios, however, such as in industrial IoT deployments, the number of subchannels within a resource pool may exceed the blind decoding limit of the first UE 115. For example, the number of subchannels in an industrial IoT resource pool may exceed 100, which may exceed the capability of the first UE 115 (e.g., as defined in a specification). As such, the first UE 115 and the second UE 115 may employ a search space including a subset of subchannel positions for blind decoding of the PSCCH (such that the first UE 115 may refrain from blind decoding over the entirety of the resource pool, which may exceed the capability of the UE 115). Accordingly, the second UE 115 may transmit the SCI-1 over time and frequency resources included in the search space and the first UE 115 may likewise perform blind decoding for the SCI-1 over the time and frequency resources included in the search space.

In some cases, the search space over which the first UE 115 and the second UE 115 may communicate may be configured in a semi-static manner, which may be reconfigured over RRC signaling relatively infrequently in comparison to the rate of change in channel conditions or channel congestion. For example, some subchannels of the configured search space may be reserved for use by other UEs 115 or may experience relatively high levels of interference such that, even if the second UE 115 transmits the SCI-1 over those subchannels, the first UE 115 would have a relatively low likelihood of successfully receiving and decoding the SCI-1.

In some implementations of the present disclosure, the second UE 115 may transmit, to the first UE 115, physical layer or media access control (MAC) layer signaling indicating an update to the search space. The update to the search space may be associated with or otherwise involve some time and frequency resources of the configured search space or of the resource pool including the configured search space, and such time and frequency resources may be referred to herein as monitoring occasions. For example, a monitoring occasion may refer to one subchannel and one slot or one PSCCH location in a slot (e.g., which may occupy 2 or 3 symbols). As such, the first UE 115 may apply the update to the search space and monitor for SCI-1 from the second UE 115 over the updated search space. Such dynamic configuration or modification of the search space over which the first UE 115 and the second UE 115 may communicate may avoid waste of blind decoding processing tasks on resources that are used by other UEs 115, provide techniques for congestion avoidance, and reduce signaling overhead as the dynamic configuration or modification of the search may provide an alternative to a complete re-configuration of the search space (e.g., another semi-static configuration).

Figure 2:
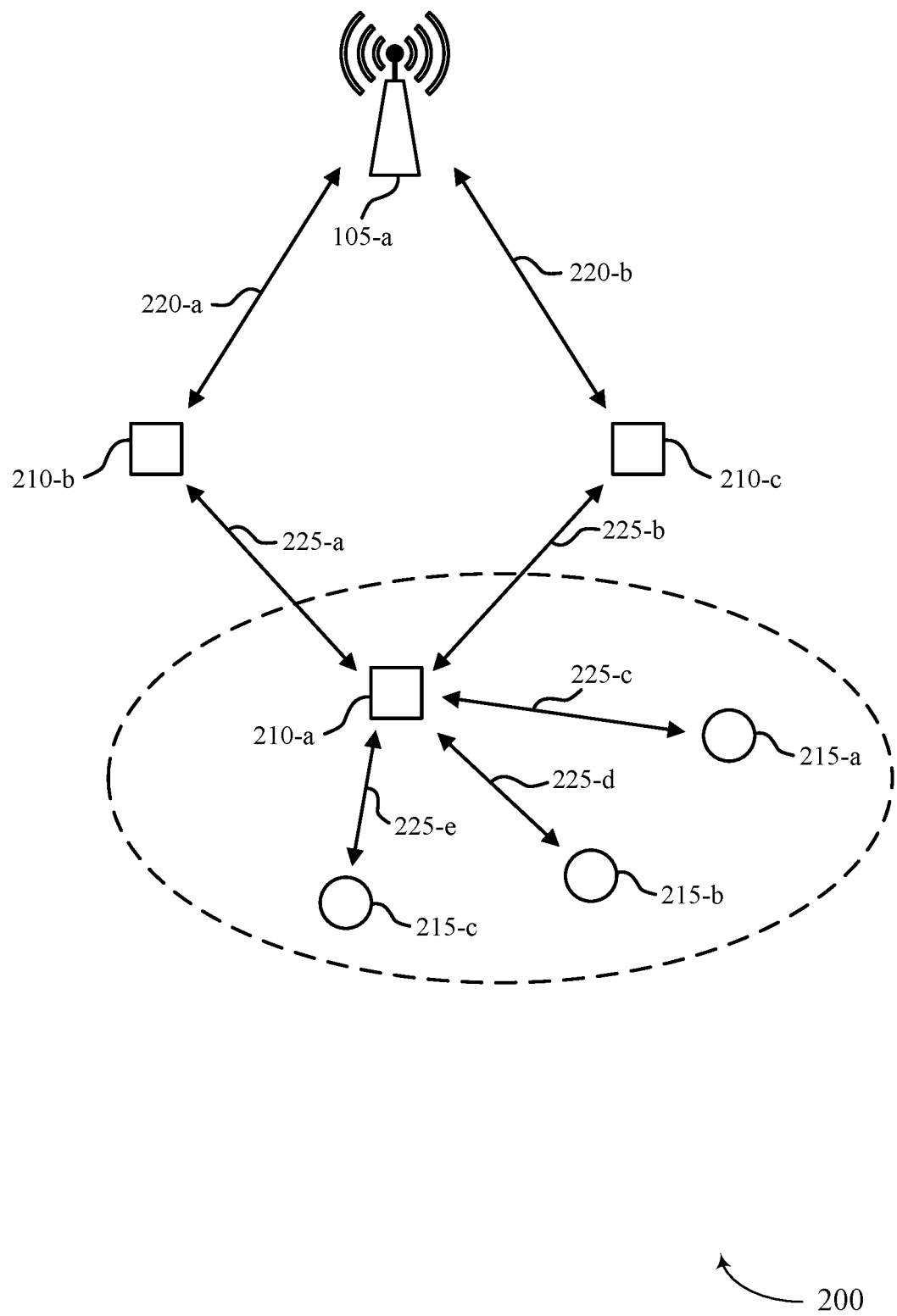

FIG. 2 illustrates an example of a wireless communications system 200 that supports techniques for dynamically updating a search space of a sidelink control channel in accordance with aspects of the present disclosure. The wireless communications system 200 includes a base station 105-a, a number of programmable logic controllers (PLCs) 210, and a number of sensors/actuators (S/As) 215. Each of the PLCs 210 and the S/As 215 may be examples of (or may otherwise be referred to or understood as) UEs 115 as described with reference to FIG. 1. In some examples, a PLC 210 (which may function as a transmitting UE 115) may transmit signaling to an S/A 215 (which may function as a receiving UE 115) indicating an update to a configured search space and the S/A 215 may accordingly monitor over the updated search space for control signaling from the PLC 210.

For example, the wireless communications system 200 may illustrate implementations of the present disclosure in an industrial IoT deployment in which a PLC 210 (e.g., a controller) and an S/A 215 may communicate with each other directly over a sidelink 225. In some aspects, each of the S/As 215 may be located at different locations on an industrial IoT device, such as a robotic arm or an assembly line. In some cases, the wireless communications system 200 may employ wireless PLCs 210 for flexible and simple deployment. Further, in some cases, a PLC 210 may control a number of S/As 215. For example, a PLC 210 may control between 20 and 50 S/As 215 in some deployments. Communication between a PLC 210 and an S/A 215 may experience tight latency (e.g., approximately 1 or 2 ms) and ultra-high reliability constraints (e.g., an error rate of $10^{-6}$). Additionally, in some cases, communication through the base station 105-a may employ multiple over-the-air (OTA) interfaces or communication links, which may affect latency and reliability of communications between devices in the wireless communications system 200. As such, a PSCCH over which the PLCs 210 and the S/As 215 may communicate may satisfy strict conditions or constraints associated with industrial IoT deployments.

In some aspects, industrial IoT traffics may sometimes be deterministic and feature small packet size (e.g., sometimes between 32 and 256 Bytes), which may be associated with low bandwidth usage. For example, a bandwidth allocation for communications between devices in the wireless communications system 200 of 2 RBs may be sufficient. In some cases, the S/As 215 may have relatively low capabilities in terms of operating bandwidth and processing power (e.g., the S/As 215 may be low capability or low complexity devices), but overall bandwidth usage for industrial IoT applications may be large and, in some examples, may include dedicated frequency bands or unlicensed frequency bands, or both. As such, the S/As 215 may refrain from detecting or monitoring some transmissions. Additionally, and based in part on the quantity of PLCs 210 and S/As 215 communicating with each other in an industrial IoT deployment, industrial IoT deployments may experience challenging radio frequency environments in which blocking and interference may occur over some frequencies.

As shown in the wireless communications system 200, the base station 105-a may communicate with a PLC 210-b and a PLC 210-c over an access link 220-a and an access link 220-b, respectively. In some examples, such as in examples in which the wireless communications system 200 operates in the first mode of resource allocation, the base station 105-a may transmit one or more of a dynamic grant, a configured grant type 1, or a configured grant type 2 to one or both of the PLC 210-b or the PLC 210-c. The PLC 210-b and the PLC 210-*c* may communicate with a PLC 210-*a* over a sidelink 225-*a* and a sidelink 225-*b*, respectively, and the PLC 210-*a* (e.g., a central entity PLC) may communicate with an S/A 215-*a* over a sidelink 225-*c*, an S/A 215-*b* over a sidelink 225-*d*, and an S/A 215-*c* over a sidelink 225-*e*.

Further, although the PLC 210-*a* is shown as outside of coverage of the base station 105-*a* (e.g., there may be a lack of a direct access link 220 between the PLC 210-*a* and the base station 105-*a*), the PLC 210-*a* may be within the coverage of the base station 105-*a* (e.g., such that the PLC 210-*a* may communicate with the base station 105-*a* directly) without exceeding the scope of the present disclosure. In some examples, such as in examples in which the PLC 210-*a* is outside of coverage of the base station 105-*a*, the PLC 210-*a* may operate according to the second mode of sidelink resource management in which the PLC 210-*a* autonomously selects resources for sidelink transmissions based on a channel sensing procedure. In some other examples, such as in examples in which the PLC 210-*a* is within the coverage of the base station 105-*a*, the PLC 210-*a* operate according to the first mode of sidelink resource management in which the PLC 210-*a* requests or otherwise receives a grant for sidelink transmissions from the base station 105-*a*.

The PLC 210-*a* may transmit to the S/As 215 to control and coordinate their actions. In some cases, for example, the PLC 210-*a* may transmit to the S/As 215 over a search space (e.g., a set of time and frequency resources of a PSCCH). For example, the PLC 210-*a* may identify a configuration of a search space over which the PLC 210-*a* may communicate with an S/A 215. In some aspects, the PLC 210-*a* may identify the configuration of the search space based on receiving the configuration from the base station 105-*a*, from one of the PLC 210-*b* or the PLC 210-*c* (which may function as a relay node), or based on a default configuration. Similarly, the S/A 215 may receive the configuration of the search space (to support mutual understanding of the search space). The S/A 215 may receive the configuration from the base station 105-*a* or the PLC 210-*a*. As described herein, the configured search space may include a subset of subchannels of the resource pool allocated to the wireless communications system 200 (e.g., allocated to the PLCs 210 and the S/As 215).

The PLC 210-*a* may select over which resource to transmit to the S/A 215 from the resources included in the search space based on which mode the PLC 210-*a* is operating. For instance, in examples in which the PLC 210-*a* operates according to the first mode, the PLC 210-*a* may receive a resource assignment from the base station 105-*a* for the transmission to the S/A 215. Alternatively, in examples in which the PLC 210-*a* operates according to the second mode, the PLC 210-*a* may select the resource to use for the transmission to the S/A 215 based on sensing the various subchannels in the PSCCH (e.g., in the configured search space). In either mode, the resources over which the PLC 210-*a* may transmit to the S/A 215 may change vary over time. For instance, in examples in which the PLC 210-*a* is operating according to the second mode, the PLC 210-*a* may select a resource based on which resources are available (e.g., not used by other devices, such as other PLCs 210 or S/As 215) and the resources that are available may change over time as channel conditions or resource assignments change.

In some cases, however, the search space may be configured semi-statically, such as via RRC signaling, which may be associated with a relatively long timeline as compared to how frequently the resource over which the PLC 210-*a* transmits to the S/A 215 changes. For example, the search space may be pre-configured with one or more monitoring occasions, such as subchannel indexes for monitoring (e.g., subchannel indexes 1, 5, 7, etc.) and a monitoring periodicity for those subchannel indexes. Such mismatch and inability to modify the configured search space based on channel conditions or congestion may be inefficient, as the S/A 215 may regularly perform blind decoding over resources that are rarely used by the PLC 210-*a*.

In some implementations of the present disclosure, the PLC 210-*a* may support a dynamic configuration of the search space over which the PLC 210-*a* and the S/A 215 communicate based on current channel conditions between the PLC 210-*a* and the S/A 215. The PLC 210-*a* may transmit signaling indicating such an update to the search space via lower layer signaling, such as physical layer signaling, that may be associated with lower latency than higher layer signaling, such as RRC layer signaling. For example, the PLC 210-*a* may transmit the signaling indicating the update to the search space via SCI, such as SCI-2, or data signaling carried by a PSSCH. Further, although described herein in the context of a search space that is configured for forward link transmissions (e.g., transmissions from the PLC 210-*a* to the S/A 215), the signaling transmitted from the PLC 210-*a* indicating the update to the search space may additionally or alternatively indicate an update to a search space that is configured for reverse link transmissions (e.g., transmissions from the S/A 215 to the PLC 210-*a*). The PLC 210-*a* may update the search space based on various factors, including based on determining (or sensing) that some resources of the configured search space are taken away by other PLCs 210 (such as the PLC 210-*b* or the PLC 210-*c*) or based on determining that some resources are otherwise favored by one or more other PLCs 210 (such that the PLC 210-*a* may give up such resources to avoid congestion).

For example, if the PLC 210-*a* (or any transmitting UE 115) determines or senses that one or more subchannels of the configured search space are reserved by another UE 115 (such as another PLC 210 or an S/A 215) periodically or for a relatively long period of time (e.g., a period of time greater than a threshold), the PLC 210-*a* may block the one or more subchannels from the search space (such that the search space becomes the configured search space minus the blocked one or more subchannels). For instance, if the PLC 210-*a* determines that a subchannel index 1 and a subchannel index 5 are reserved by another UE 115 (or other UEs 115) in the next 100 slots, the PLC 210-*a* may block the subchannel indexes 1 and 5 from the search space to avoid unnecessary blind decoding of the subchannel indexes 1 and 5 at the S/A 215 (as the PLC 210-*a* may not transmit over the subchannels at indexes 1 and 5 for at least the next 100 slots).

Additionally or alternatively, the PLC 210-*a* may determine or sense that one or more subchannels are free to use (e.g., available) and the signaling indicating the update to the search space may indicate an addition of the index entries associated with the one or more subchannels to the search space. Accordingly, the S/A 215, based on receiving an indication of the addition of the one or more subchannels, may monitor and perform blind decoding over the one or more added subchannels (e.g., in the future). Similarly, the PLC 210-*a* may determine or sense that one or more (previously) blocked subchannel entries become free again (e.g., become available after a period of time of being reserved by other UEs 115 or otherwise blocked from the search space) and the signaling indicating the update to the search space may indicate a reactivation of the one or more subchannels. Accordingly, the S/A 215 may resume monitoring and blind decoding of the one or more reactivated subchannels.

Additionally or alternatively, the PLC 210-*a* and the S/A 215 may be configured (e.g., via RRC signaling) with one or more groups of search spaces and the PLC 210-*a* may instruct the S/A 215 to switch from one search space monitoring group to a different search space monitoring group via the signaling indicating the update to the search space. For example, the PLC 210-*a* and the S/A 215 may be configured (e.g., pre-configured) with a set of search space types or groups and each search space type or group may be associated with a different blocking pattern (such that different search space types or groups feature different patterns of blocked subchannels). For instance, the PLC 210-*a* and the S/A 215 may support an unrestricted search space (which may be associated with an absence of or relatively little subchannel blocking), a Type-A search space (which may be associated with a first subchannel blocking pattern), and a Type-B search space (which may be associated with a second subchannel blocking pattern different than the first).

As such, the Type-A and the Type-B search spaces may include blocked subchannel entries, which may be pre-configured or pre-selected by the PLC 210-*a* (e.g., the transmitting UE 115) to avoid congestion or collision among devices, such as S/As 215. In some aspects, the Type-A and the Type-B search spaces may be employed upon entrance of the PLC 210-*a* or the S/A 215 into a low power mode or a power saving mode. In such examples in which the PLC 210-*a* and the S/A 215 may be configured with one or more groups of search spaces, the signaling indicating the update to the search space may indicate a switch to a Type-X search space (instead of indicating one or more blocking or adding commands). Each search space of the set of search spaces may be configured (e.g., updated or otherwise modified) and, in some aspects, a first search space (e.g., a search space group 1) may be configured as a default search space from which the S/A 215 may switch to a second search space (e.g., a search space group 2) based on a command from the PLC 210-*a* (e.g., via a bit in SCI-2 or PSSCH). Accordingly, the PLC 210-*a* and the S/A 215 may feature flexible adaptation within short periods of time if interference or congestion is worse in one search space group than in another search space group.

In some implementations, the PLC 210-*a* may also indicate, in the signaling indicating the update to the search space, a timer indicating a suspension of the update to the search space. For example, the PLC 210-*a* may block, add, or reactive subchannel entries for a period of time defined by the timer such that the update to the search space is valid for a duration of the timer and invalid upon expiration of the timer. In some other implementations, the timer indicating the suspension of the update to the search space may configured at the S/A 215 as a default value (e.g., without explicit signaling from the PLC 210-*a*). Additionally or alternatively, the signaling indicating the update to the search space may include offset or timer parameters that indicate a time to apply the update to the search space. For example, based on receiving the signaling indicating the update to the search space and including an offset indicating the time to apply the update to the search space, the S/A 215 may block, add, or reactivate subchannel entries to or from the search space according to the update at the time indicated by the offset or timer. In some aspects, the offset may refer to a time delay (e.g., a number of slots, such as 2 slots) until application of the update to the search space. In addition or as an alternative to updating which subchannels are included in the search space, the PLC 210-*a* may additionally update the monitoring periodicity associated with the search space or any other parameters associated with the search space.

The PLC 210-*a* may transmit the signaling indicating the update to the search space via SCI-2 or data over a PSSCH. In examples in which the PLC 210-*a* provides the update to the search space via SCI-2, the PLC 210-*a* may transmit the update to the search space via a specific format of SCI-2 or via one or more fields of an SCI-2. Such one or more fields of the SCI-2 may include one or more command indication fields indicating the blocking, adding, reactivating, switching, or any other update to the search space, a search space identifier field indicating a search space index in the forward link or the reverse link to which the update corresponds, one or more search space entries fields indicating the subchannel entries of the search space that the update command applies to, a timer field indicating a period of time (e.g., in slots) over which the update to the search space is valid, an offset field indicating the time when the update command is enforced, an indication field including a request for assistance information or updating command, or any combination thereof. In examples in which the signaling indicating the update to the search space is transmitted via PSSCH, the PSSCH may carry the update to the search space with a MAC channel or upper layer logical channel with a design of reference signal received power (RSRP) measurement report. For example, if the PLC 210-*a* requests full assistance information associated with a search space of the S/A 215, the full RSRP measurement report may include a relatively large number of bits in a payload, which may be more efficiently carried via PSSCH than SCI-2.

The S/A 215, based on receiving the signaling indicating the update to the search space, may acknowledge the command (e.g., the update) by transmitting an acknowledgement of the signaling indicating the update to the search space. For example, the S/A 215 may transmit feedback to the PLC 210-*a* responsive to the search space update. In some aspects, the S/A 215 may transmit the feedback (e.g., the acknowledgement) via a MAC control element (MAC-CE). As such, the PLC 210-*a* and the S/A 215 may ensure reliability of the commands from the PLC 210-*a* to update the search space. In some examples, the S/A 215 or another UE 115 (a different S/A 215 or another PLC 210) may provide the PLC 210-*a* with assistance information for updating the search space. In some cases, for example, the PLC 210-*a* (the transmitting UE 115) may be unaware that a subchannel entry in the search space is occupied or is otherwise experiencing high levels of interference, but other UEs 115 may be aware of such occupancy or interference. Such occupancy or interference of which the PLC 210-*a* is unaware may be referred to herein as a hidden node issue and the discrepancy in awareness of the occupancy or interference may be a result of the different radio frequency environments experienced by the various devices in the wireless communications system 200.

In some examples, the S/A 215 or the other UE 115 may transmit assistance information to the PLC 210-*a* to assist the PLC 210-*a* in determining updates to the search space. Such assistance information may include one or more receive strength measurements or interference measurements, such as RSRP measurements or reference signal strength indicator (RSSI) measurements. For example, the S/A 215 or the other UE 115 may measure a quality of the subchannels in the search space and may transmit a measurement report to the PLC 210-*a* indicating the measured channel quality of the subchannels in the search space.

In some implementations, the S/A 215 or the other UE 115 may transmit the measurement report to the PLC 210-*a* if the S/A 215 or the other UE 115 measures relatively large interference (e.g., a relatively high energy level) in a subchannel entry of the search space. In other words, the transmission of the measurement report may be triggered by sufficiently large changes in the interference measurements of the search space. For instance, in examples in which the S/A 215 or the other UE 115 senses a collision in a subchannel (which may occur if two UEs 115, such as PLCs 210 or S/As 215, reserve a same subchannel), the S/A 215 or the other UE 115 may measure an interference measurement value (e.g., an RSSI) for the subchannel above a threshold and may transmit the measurement report to the PLC 210-*a* based on the interference measurement value exceeding the threshold. In some aspects, the PLC 210-*a* may transmit an indication of the threshold to the S/A 215. Additionally or alternatively, the S/A 215 or the other UE 115 may transmit the measurement report (e.g., the assistance information) periodically or in response to receiving a request from the PLC 210-*a*.

The PLC 210-*a* may receive the measurement report from the S/A 215 or the other UE 115 and may decide or otherwise determine the update to the search space based on the provided measurement report and based on a resource utilization in the search space (as measured from the PLC 210-*a*). For example, the PLC 210-*a* may transmit a search space update command to the S/A 215 indicating an update to the search space in response to receiving the measurement report from the S/A 215 or the other UE 115 (e.g., the S/A 215 or the other UE 115 may request an update to the search space via the measurement report). In some other examples, the PLC 210-*a* may give resources indicated to experience interference or congestion by the S/A 215 or the other UE 115 a lower priority in a resource selection procedure. For instance, in examples in which the PLC 210-*a* determines over which resource to transmit to the S/A 215 (e.g., in operation according to the second mode), the PLC 210-*a* may lower a likelihood of selecting the resources that experience interference or congestion relative to other resources in the search space. In some aspects, the PLC 210-*a* may lower such a priority of resources for the resource selection procedure without notifying the S/A 215.

Further, PLCs 210 may communicate with each other and coordinate on search space updates. For example, the PLC 210-*a* may receive a measurement report from the S/A 215-*c* indicating that an S/A 215 controlled by the PLC 210-*b* is causing interference at the S/A 215-*c* in resources of the search space of the S/A 215-*c*. In such examples, the PLC 210-*a* may forward the measurement report to the PLC 210-*b* or otherwise request the PLC 210-*b* to update the search space of the S/A 215 controlled by the PLC 210-*b* to reduce interference or congestion between the S/A 215-*c* and the S/A 215 controlled by the PLC 210-*b*. Further, in some examples, the update to the search space may be requested by the base station 105-*a*, other PLCs 210, or initiated at the PLC 210-*a*.

Figure 3:
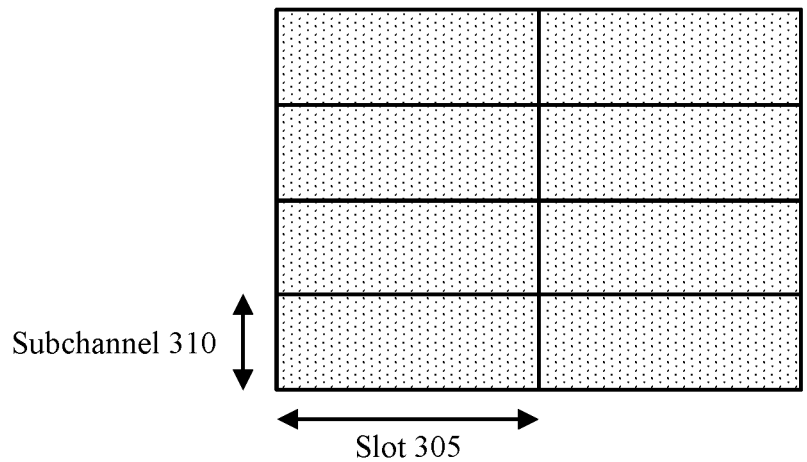
FIG. 3 illustrates an example of a resource pool that supports techniques for dynamically updating a search space of a sidelink control channel in accordance with aspects of the present disclosure.

FIG. 3 illustrates an example of a resource pool 300 that supports techniques for dynamically updating a search space of a sidelink control channel in accordance with aspects of the present disclosure. The resource pool 300 may include a number of subchannels 310 in the frequency domain and a number of slots 305 in the time domain. In some examples, a first UE 115 (e.g., a receiving UE 115, such as an S/A 215 as described with reference to FIG. 2) and a second UE 115 (e.g., a transmitting UE 115, such as a PLC 210 as described with reference to FIG. 2) may be configured with a search space including a subset of resources of the resource pool 300 and the second UE 115 may transmit signaling to the first UE 115 indicating an update to the search space.

In some aspects, a number of UEs 115 may share the resource pool 300 and, to receive a sidelink packet, the first UE 115 may perform blind decoding over subchannels 310 and slots 305 in the search space for the first UE 115. The second UE 115 may transmit over a PSCCH and a PSSCH within a same slot 305, as further illustrated by and described with reference to FIG. 5. In some examples, a PSSCH transmission may occupy a number of contiguous subchannels 310. For example, a PSSCH transmission may occupy up to $N_{subchannel}^{SL}$ of contiguous subchannels 310. In some aspects, a subchannel size in some deployments, such as V2X deployments, may include a lower limit of 10 RBs. A PSCCH transmission may occupy a number of subchannels 310 (e.g., up to one subchannel 310) with a lowest subchannel index.

The second UE 115 may transmit SCI-1, which may be equivalently referred to as 1st stage SCI, over a PSCCH and the SCI-1 may include information about the bandwidth of a corresponding PSSCH and resource reservations in future slots. Additional information relating to such reservation of resources in future slots are described herein, including with reference to FIG. 4. The first UE 115 may find and decode SCI-2, which may be equivalently referred to as 2nd stage SCI, based on decoding the PSCCH carrying the SCI-1. The SCI-2 may include a source identifier (ID) and a destination ID that identifies whether the packet is for the first UE 115 and from which UE 115 the packet is transmitted (e.g., the second UE 115).

Figure 4:
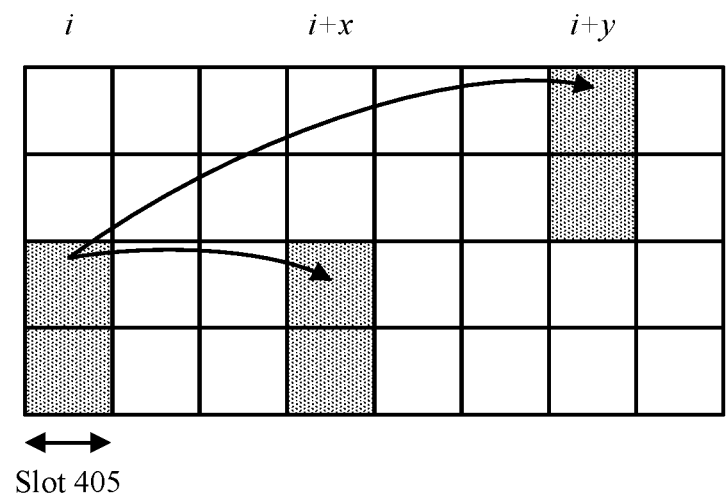
FIG. 4 illustrates an example of a reservation scheme that supports techniques for dynamically updating a search space of a sidelink control channel in accordance with aspects of the present disclosure.

FIG. 4 illustrates an example of a reservation scheme 400 that supports techniques for dynamically updating a search space of a sidelink control channel in accordance with aspects of the present disclosure. The reservation scheme 400 illustrates how an SCI-1 carried in PSCCH may indicate one or more resource reservations for upcoming slots 405. In some implementations, if a second UE 115 (e.g., a transmitting UE 115, such as a PLC 210 as described with reference to FIG. 2) determines that another UE 115 has reserved a subchannel periodically or for a relatively long duration (e.g., greater than a threshold number of slots 405), the second UE 115 may transmit an update to a configured search space blocking the subchannel to avoid unnecessary blind decoding by a first UE 115 (e.g., a receiving UE 115, such as an S/A 215 as described with reference to FIG. 2).

For example, an SCI-1 may indicate a resource reservation for a number of future slots 405 via a number of bits. In some aspects, the SCI-1 may indicate a frequency domain resource allocation for 2 reservations with a quantity of bits as defined by Equation (1), shown below:

$$\left\lceil \log \frac{N_{subchannel}^{SL}(N_{subchannel}^{SL}+1)}{2} \right\rceil \quad (1)$$

As shown in Equation 1, $N_{subchannel}^{SL}$ may refer to a quantity of sidelink subchannels. Further, the SCI-1 may indicate a frequency domain resource allocation for 3 reservations with a quantity of bits as defined by Equation (2), shown below:

$$\left\lceil \log \frac{N_{subchannel}^{SL}(N_{subchannel}^{SL}+1)(2N_{subchannel}^{SL}+1)}{6} \right\rceil \quad (2)$$

The SCI-1 may also indicate a time domain resource allocation for 2 reservations with 5 bits and may indicate a time domain resource allocation for 3 reservations with 9 bits. In some aspects, the reservation scheme 400 may illustrate a reservation of resources for an SCI received at a slot i at a slot i+x and a slot i+y, where $0 < x \leq 31$ and $0 < y \leq 31$. The reservations signaled by the SCI-1 may be further described by Table 1, where each reservation may include a number of z subchannels.

TABLE 1

Reservation Scheme 400
Reservations Signaled by an SCI in slot i

| Reservation | # Subchannels | Slot |
|---|---|---|
| 1 | z | i |
| 2 | z | i + x: 0 < x ≤ 31 |
| 3 | z | i + y: 0 < y ≤ 31 |

Figure 5:
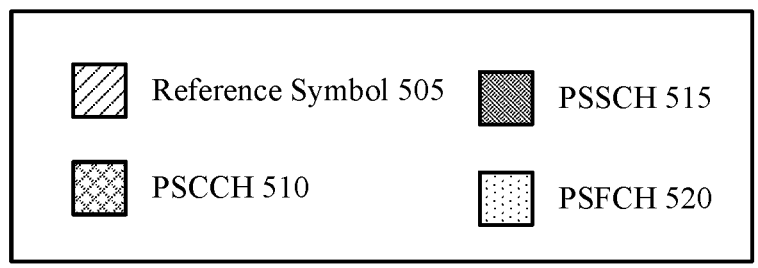
FIG. 5 illustrates an example of a slot configuration that supports techniques for dynamically updating a search space of a sidelink control channel in accordance with aspects of the present disclosure.
Figure 5:
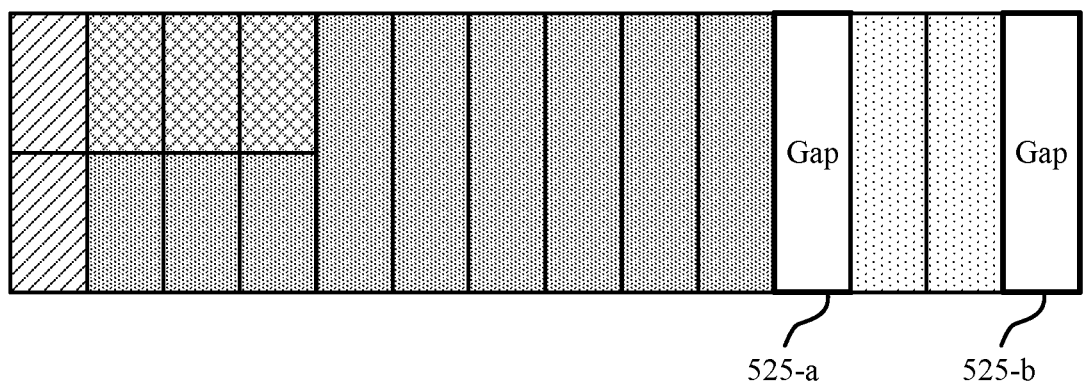

FIG. 5 illustrates an example of a slot configuration 500 that supports techniques for dynamically updating a search space of a sidelink control channel in accordance with aspects of the present disclosure. The slot configuration 500 illustrates a sidelink slot including a reference symbol 505, a PSCCH 510, a PSSCH 515, a gap 525-*a*, a physical sidelink feedback channel (PSFCH) 520, and a gap 525-*b*. In some examples, the PSCCH 510 (and, in some examples, the PSSCH 515) may be included within a search space over which a first UE 115 may perform blind decoding for SCI-1 (and, in some examples, SCI-2) from a second UE 115.

For example, the PSCCH 510 may include SCI-1 and the PSSCH 515 may include SCI-2, and the first UE 115 may perform blind decoding for the SCI-1 or for both the SCI-1 and the SCI-2. In some aspects, the PSCCH 510 may be configured (e.g., pre-configured) to occupy one of {10, 12, 15, 20, 25} PRBs that may be limited to a single subchannel and a duration of the PSCCH 510 may be configured (e.g., pre-configured) to two or three symbols. In some aspects, a subchannel may occupy one of {10, 15, 20, 25, 50, 75, 100} PRBs. A size of the PSCCH 510 may be fixed for a resource pool. For example, the PSCCH 510 may be fixed at 10% to 100% of one subchannel (e.g., in the first two or three symbols) depending on a configuration. In some aspects, the PSSCH 515 may occupy at least one subchannel.

Figure 6:
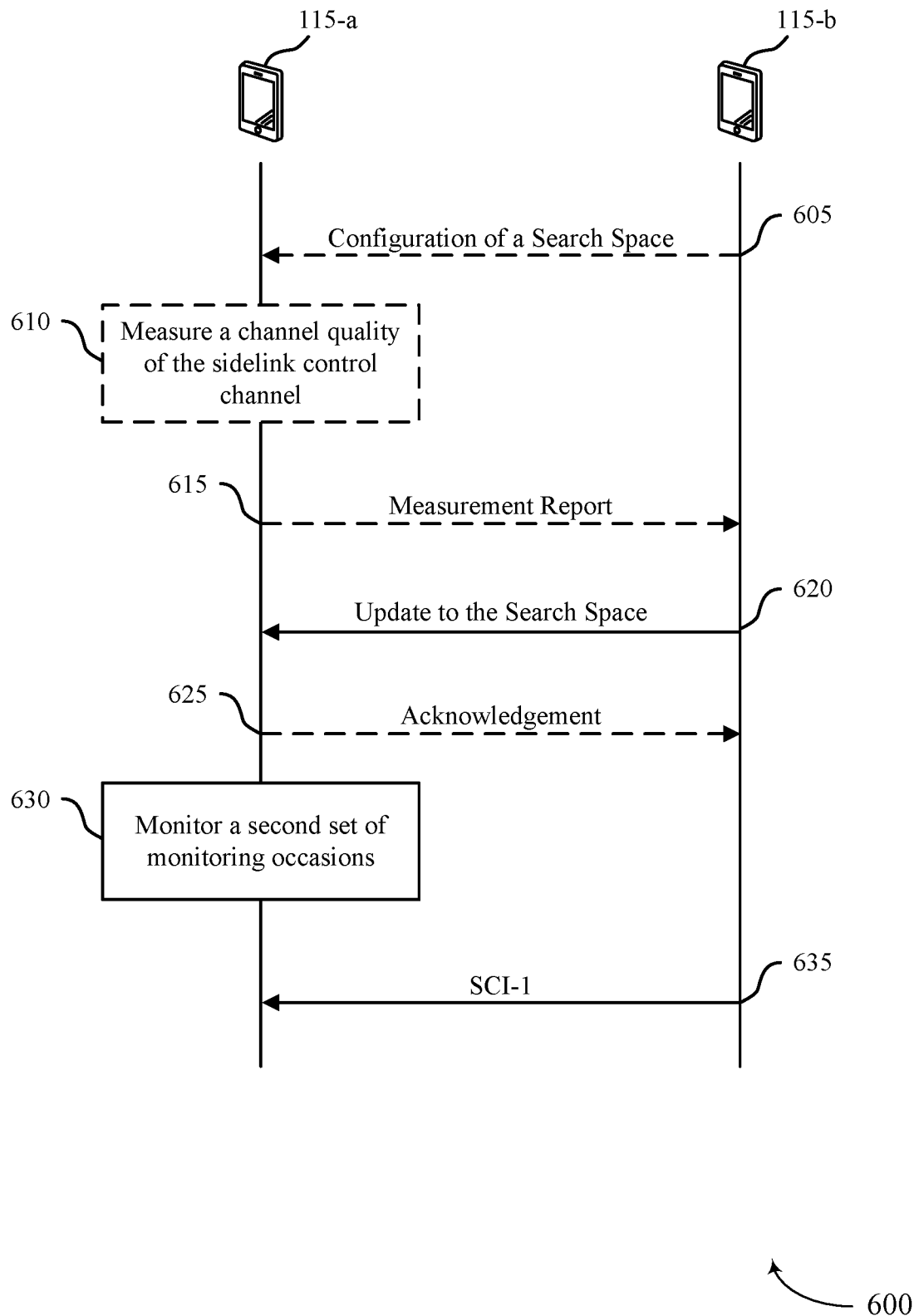
FIG. 6 illustrates an example of a process flow that supports techniques for dynamically updating a search space of a sidelink control channel in accordance with aspects of the present disclosure.

FIG. 6 illustrates an example of a process flow 600 that supports techniques for dynamically updating a search space of a sidelink control channel in accordance with aspects of the present disclosure. The process flow may include a UE 115-*a* (e.g., a first UE 115) and a UE 115-*b* (e.g., a second UE 115). In some aspects, the UE 115-*a* may be an example of a receiving UE 115, such as an S/A 215 as described with reference to FIG. 2, and the UE 115-*b* may be an example of a transmitting UE 115, such as a PLC 210 as also described with reference to FIG. 2. In some implementations, the UE 115-*a* may receive signaling indicating dynamic updates to a configured search space and the UE 115-*a* may monitor over the dynamically updated search space for sidelink transmissions from the UE 115-*b*.

At 605, the UE 115-*a* may receive a configuration of a search space for the UE 115-*a* including a first set of monitoring occasions of a sidelink control channel. In some examples, the UE 115-*a* may receive the configuration of the search space from the UE 115-*b*. In some other examples, the UE 115-*a* may receive the configuration of the search space from a serving base station 105. A monitoring occasion may refer to a resource in both the time and the frequency domain, such as a subchannel and a slot or a subchannel and a number of symbols. The first set of monitoring occasions may include a subset of resources included within a resource pool shared between the UE 115-*a*, the UE 115-*b*, and potentially a number of other UEs 115. In some aspects, the UE 115-*a* may receive the configuration of the search space in a semi-static manner, such as via RRC signaling.

At 610, the UE 115-*a* may, in some implementations, measure a channel quality of the sidelink control channel between the UE 115-*a* and the UE 115-*b*. In some examples, the UE 115-*a* may measure each subchannel or monitoring occasion of the first set of monitoring occasions to identify whether any of the subchannels or monitoring occasions in the first set of monitoring occasions experience relatively high interference levels or congestion. For example, the UE 115-*a* may measure an interference value or an energy level associated with at least one of the first set of monitoring occasions.

At 615, the UE 115-*a* may, in some implementations, transmit a measurement report to the UE 115-*b* including the interference measurement value associated with the at least one of the first set of monitoring occasions. In some examples, the UE 115-*a* may transmit the measurement report based on determining that a measured interference measurement value exceeds a threshold. In some other examples, the UE 115-*a* may transmit the measurement report according to a periodic transmission schedule received from the UE 115-*b*. In some other examples, the UE 115-*a* may transmit the measurement report upon request from the UE 115-*b*.

At 620, the UE 115-*b* may transmit, to the UE 115-*a*, signaling indicating an update to the search space. The update to the search space may indicate a blocking of one or more subchannels from the configured search space, an addition of one or more subchannels to the configured search space, a reactivation of one or more (previously blocked) subchannels, or any combination thereof. Additionally or alternatively, the update to the search space may indicate a switching from one search space of a configured set of search spaces to a different search space of the configured set of search spaces, each search space of the configured set of search spaces associated with a different monitoring occasion blocking pattern.

At 625, the UE 115-*a* may, in some implementations, transmit an acknowledgement of the signaling indicating the update to the search space. In some examples, such transmission of the acknowledgement of the update to the search space may support reliability of the update to the search space.

At 630, the UE 115-*a* may monitor a second set of monitoring occasions of the sidelink control channel based on the configuration of the search space and the update to the search space. For example, the UE 115-*a* may monitor the configured search space minus one or more blocked monitoring occasions, plus one or more added monitoring occasions, plus (or otherwise including) one or more reactivated monitoring occasions, or any combination thereof. Additionally or alternatively, the UE 115-*a* may switch from monitoring a first search space associated with a first monitoring occasion blocking pattern based on the configuration of the search space to monitoring a second search space associated with a second monitoring occasion based on the update to the search space.

At 635, the UE 115-*b* may transmit, to the UE 115-*a*, a first part of SCI (e.g., SCI-1) over a subset of the second set of monitoring occasions of the sidelink control channel based on the configuration of the search space and the update to the search space. Likewise, based on monitoring and blind decoding over the second set of monitoring occasions, the UE 115-*a* may receive the SCI-1.

Figure 7:
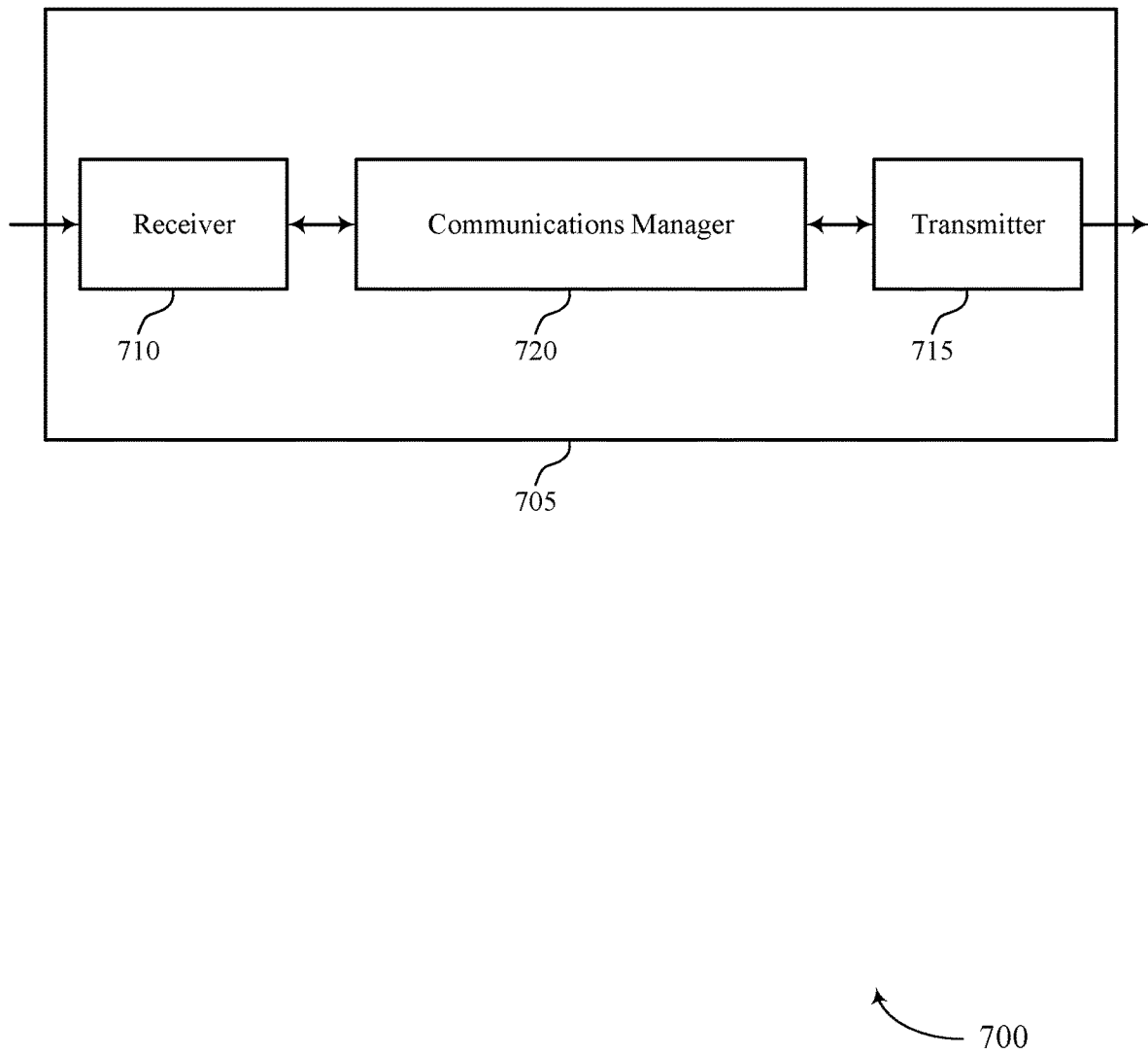
FIGS. 7 and 8 show block diagrams of devices that support techniques for dynamically updating a search space of a sidelink control channel in accordance with aspects of the present disclosure.

FIG. 7 shows a block diagram 700 of a device 705 that supports techniques for dynamically updating a search space of a sidelink control channel in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for dynamically updating a search space of a sidelink control channel). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for dynamically updating a search space of a sidelink control channel). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for dynamically updating a search space of a sidelink control channel as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. For example, the communications manager 720 may be configured as or otherwise support a means for receiving a configuration of a search space for the first UE including a first set of multiple monitoring occasions of a sidelink control channel. The communications manager 720 may be configured as or otherwise support a means for receiving, from a second UE, signaling indicating an update to the search space, the update associated with one or more monitoring occasions of the sidelink control channel. The communications manager 720 may be configured as or otherwise support a means for monitoring a second set of multiple monitoring occasions of the sidelink control channel based on the configuration of the search space and the update to the search space. The communications manager 720 may be configured as or otherwise support a means for receiving a first part of SCI based on the monitoring.

Additionally or alternatively, the communications manager 720 may support wireless communication at a second UE in accordance with examples as disclosed herein. For example, the communications manager 720 may be configured as or otherwise support a means for identifying a configuration of a search space for a first UE including a first set of multiple monitoring occasions of a sidelink control channel. The communications manager 720 may be configured as or otherwise support a means for transmitting, to the first UE, signaling indicating an update to the search space, the update associated with one or more monitoring occasions of the sidelink control channel. The communications manager 720 may be configured as or otherwise support a means for transmitting, to the first UE, a first part of SCI over a subset of a second set of multiple monitoring occasions of the sidelink control channel based on the configuration of the search space and the update to the search space.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing, reduced power consumption, and more efficient utilization of communication resources. For example, based on dynamically updating a configured search space based on current channel conditions (e.g., including interference or congestion of the channel), the communications manager 720 may perform blind decoding over fewer monitoring occasions, which may result in improved power savings and increased battery life at the device 705.

Figure 8:
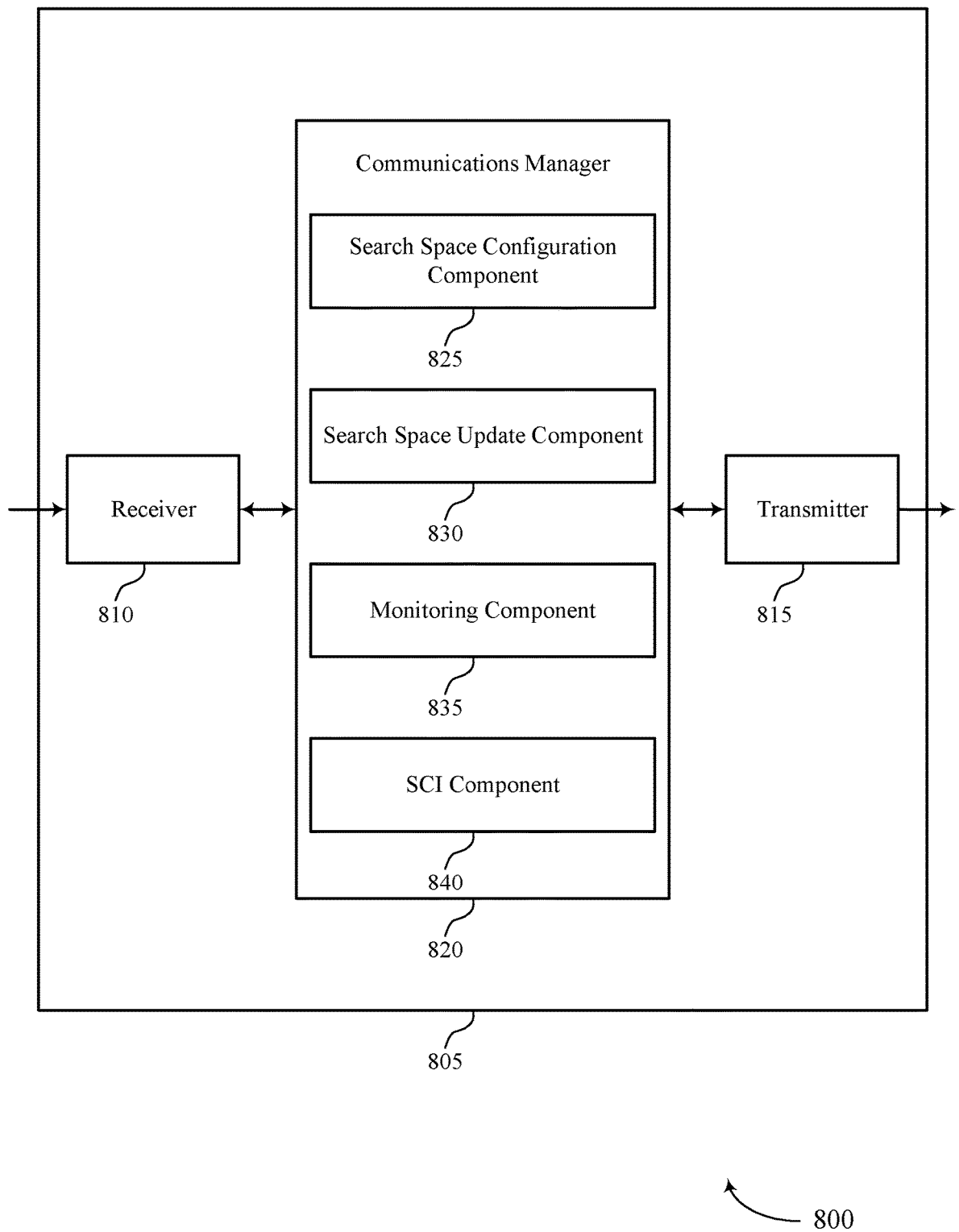

FIG. 8 shows a block diagram 800 of a device 805 that supports techniques for dynamically updating a search space of a sidelink control channel in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for dynamically updating a search space of a sidelink control channel). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for dynamically updating a search space of a sidelink control channel). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for dynamically updating a search space of a sidelink control channel as described herein. For example, the communications manager 820 may include a search space configuration component 825, a search space update component 830, a monitoring component 835, an SCI component 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first UE in accordance with examples as disclosed herein. The search space configuration component 825 may be configured as or otherwise support a means for receiving a configuration of a search space for the first UE including a first set of multiple monitoring occasions of a sidelink control channel. The search space update component 830 may be configured as or otherwise support a means for receiving, from a second UE, signaling indicating an update to the search space, the update associated with one or more monitoring occasions of the sidelink control channel. The monitoring component 835 may be configured as or otherwise support a means for monitoring a second set of multiple monitoring occasions of the sidelink control channel based on the configuration of the search space and the update to the search space. The SCI component 840 may be configured as or otherwise support a means for receiving a first part of SCI based on the monitoring.

Additionally or alternatively, the communications manager 820 may support wireless communication at a second UE in accordance with examples as disclosed herein. The search space configuration component 825 may be configured as or otherwise support a means for identifying a configuration of a search space for a first UE including a first set of multiple monitoring occasions of a sidelink control channel. The search space update component 830 may be configured as or otherwise support a means for transmitting, to the first UE, signaling indicating an update to the search space, the update associated with one or more monitoring occasions of the sidelink control channel. The SCI component 840 may be configured as or otherwise support a means for transmitting, to the first UE, a first part of SCI over a subset of a second set of multiple monitoring occasions of the sidelink control channel based on the configuration of the search space and the update to the search space.

Figure 9:
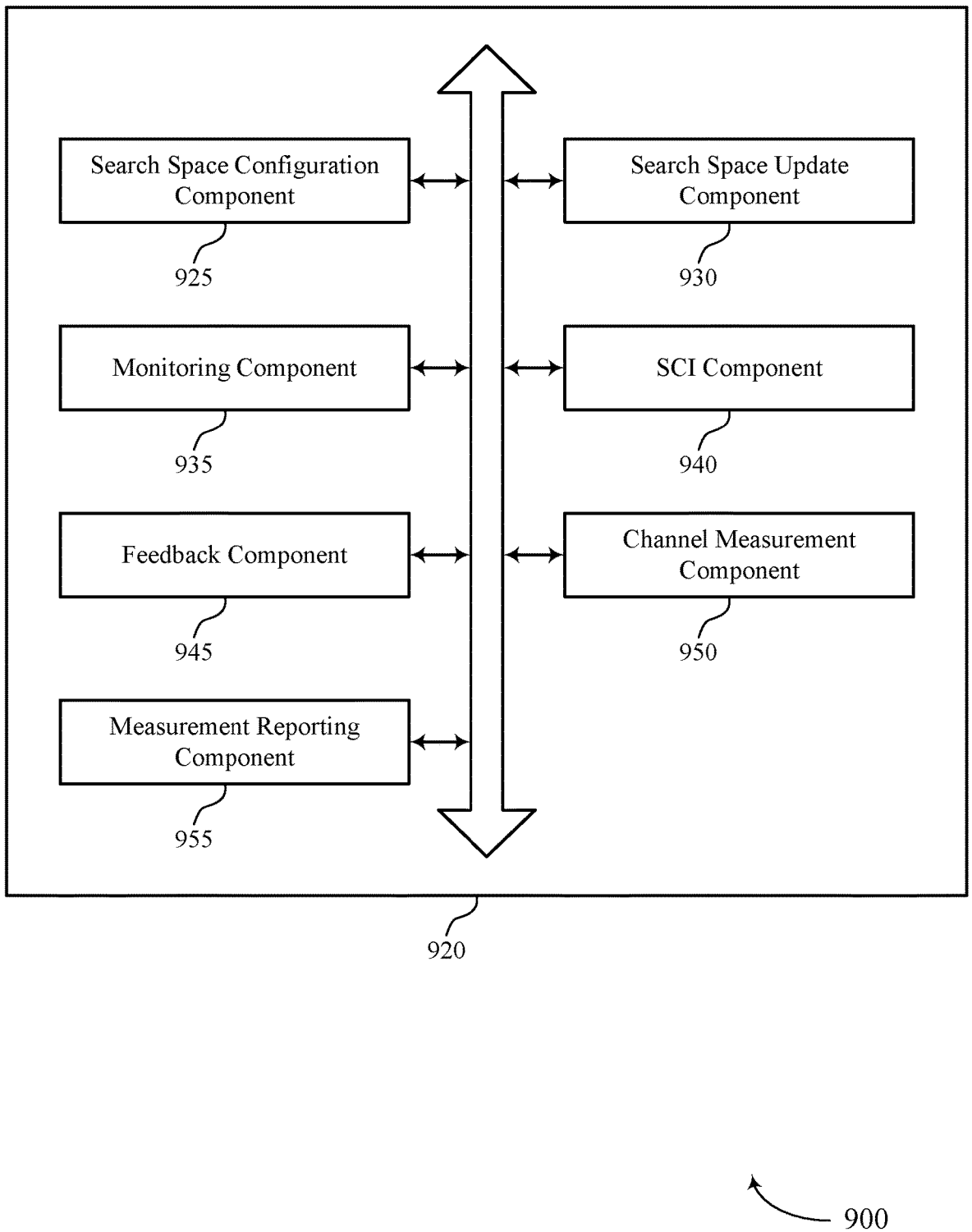
FIG. 9 shows a block diagram of a communications manager that supports techniques for dynamically updating a search space of a sidelink control channel in accordance with aspects of the present disclosure.

FIG. 9 shows a block diagram 900 of a communications manager 920 that supports techniques for dynamically updating a search space of a sidelink control channel in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for dynamically updating a search space of a sidelink control channel as described herein. For example, the communications manager 920 may include a search space configuration component 925, a search space update component 930, a monitoring component 935, an SCI component 940, a feedback component 945, a channel measurement component 950, a measurement reporting component 955, or any combination thereof. Each of these components may communicate, directly or indirectly, with one another (e.g., via one or more buses).

The communications manager 920 may support wireless communication at a first UE in accordance with examples as disclosed herein. The search space configuration component 925 may be configured as or otherwise support a means for receiving a configuration of a search space for the first UE including a first set of multiple monitoring occasions of a sidelink control channel. The search space update component 930 may be configured as or otherwise support a means for receiving, from a second UE, signaling indicating an update to the search space, the update associated with one or more monitoring occasions of the sidelink control channel. The monitoring component 935 may be configured as or otherwise support a means for monitoring a second set of multiple monitoring occasions of the sidelink control channel based on the configuration of the search space and the update to the search space. The SCI component 940 may be configured as or otherwise support a means for receiving a first part of SCI based on the monitoring.

In some examples, to support receiving the signaling indicating the update to the search space, the search space update component 930 may be configured as or otherwise support a means for receiving an indication of a blocking, from the search space, of the one or more monitoring occasions of the sidelink control channel, where the second set of multiple monitoring occasions includes a difference between the first set of multiple monitoring occasions and the one or more monitoring occasions. In some examples, to support receiving the signaling indicating the update to the search space, the search space update component 930 may be configured as or otherwise support a means for receiving an indication of an addition, to the search space, of the one or more monitoring occasions of the sidelink control channel, where the second set of multiple monitoring occasions includes a sum of the first set of multiple monitoring occasions and the one or more monitoring occasions.

In some examples, to support receiving the signaling indicating the update to the search space, the search space update component 930 may be configured as or otherwise support a means for receiving an indication of a reactivation of the one or more monitoring occasions of the sidelink control channel, where the second set of multiple monitoring occasions includes at least the one or more monitoring occasions. In some examples, receiving the configuration of the search space includes receiving a first indication of a first search space of the set of search spaces. In some examples, receiving the signaling indicating the update to the search space includes receiving a second indication of a switch from the first search space to a second search space of the set of search spaces.

In some examples, the first search space is associated with a first monitoring occasion blocking pattern and the second search space is associated with a second monitoring occasion blocking pattern. In some examples, to support receiving the signaling indicating the update to the search space, the search space update component 930 may be configured as or otherwise support a means for receiving a timer indicating a suspension of the update to the search space, where the update to the search space is valid for a duration of the timer and invalid upon expiration of the timer. In some examples, to support receiving the signaling indicating the update to the search space, the search space update component 930 may be configured as or otherwise support a means for receiving an offset indicating a time to apply the update to the search space.

In some examples, the feedback component 945 may be configured as or otherwise support a means for transmitting, to the second UE, an acknowledgement of the signaling indicating the update to the search space.

In some examples, the channel measurement component 950 may be configured as or otherwise support a means for measuring a channel quality of the sidelink control channel. In some examples, the measurement reporting component 955 may be configured as or otherwise support a means for transmitting, to the second UE, a measurement report including an interference measurement value associated with at least one of the first set of multiple monitoring occasions based on measuring the channel quality of the sidelink control channel, where the update to the search space is based on the interference measurement value.

In some examples, the measurement reporting component 955 may be configured as or otherwise support a means for receiving an indication of a threshold associated with transmission of the measurement report, where transmitting the measurement report including the interference measurement value associated with the at least one of the first set of multiple monitoring occasions is based on the interference measurement value exceeding the threshold. In some examples, the measurement reporting component 955 may be configured as or otherwise support a means for receiving, from the second UE, a periodic transmission schedule for the measurement report, where transmitting the measurement report is based on the periodic transmission schedule. In some examples, the signaling indicating the update to the search space is received via a second part of SCI or a sidelink data channel. In some examples, the update to the search space applies to one or both of a forward link or a reverse link.

Additionally or alternatively, the communications manager 920 may support wireless communication at a second UE in accordance with examples as disclosed herein. In some examples, the search space configuration component 925 may be configured as or otherwise support a means for identifying a configuration of a search space for a first UE including a first set of multiple monitoring occasions of a sidelink control channel. In some examples, the search space update component 930 may be configured as or otherwise support a means for transmitting, to the first UE, signaling indicating an update to the search space, the update associated with one or more monitoring occasions of the sidelink control channel. In some examples, the SCI component 940 may be configured as or otherwise support a means for transmitting, to the first UE, a first part of SCI over a subset of a second set of multiple monitoring occasions of the sidelink control channel based on the configuration of the search space and the update to the search space.

In some examples, to support transmitting the signaling indicating the update to the search space, the search space update component 930 may be configured as or otherwise support a means for transmitting an indication of a blocking, from the search space, of the one or more monitoring occasions of the sidelink control channel, where the second set of multiple monitoring occasions includes a difference between the first set of multiple monitoring occasions and the one or more monitoring occasions. In some examples, to support transmitting the signaling indicating the update to the search space, the search space update component 930 may be configured as or otherwise support a means for transmitting an indication of an addition, to the search space, of the one or more monitoring occasions of the sidelink control channel, where the second set of multiple monitoring occasions includes a sum of the first set of multiple monitoring occasions and the one or more monitoring occasions.

In some examples, to support transmitting the signaling indicating the update to the search space, the search space update component 930 may be configured as or otherwise support a means for transmitting an indication of a reactivation of the one or more monitoring occasions of the sidelink control channel, where the second set of multiple monitoring occasions includes at least the one or more monitoring occasions. In some examples, the method further includes transmitting, to the first UE, a first indication of a first search space of the set of search spaces. In some examples, transmitting the signaling indicating the update to the search space includes transmitting a second indication of a switch from the first search space to a second search space of the set of search spaces.

In some examples, the first search space is associated with a first monitoring occasion blocking pattern and the second search space is associated with a second monitoring occasion blocking pattern. In some examples, to support transmitting the signaling indicating the update to the search space, the search space update component 930 may be configured as or otherwise support a means for transmitting a timer indicating a suspension of the update to the search space, where the update to the search space is valid for a duration of the timer and invalid upon expiration of the timer. In some examples, to support transmitting the signaling indicating the update to the search space, the search space update component 930 may be configured as or otherwise support a means for transmitting an offset indicating a time to apply the update to the search space.

In some examples, the feedback component 945 may be configured as or otherwise support a means for receiving, from the first UE, an acknowledgement of the signaling indicating the update to the search space.

In some examples, the measurement reporting component 955 may be configured as or otherwise support a means for receiving, from the first UE, a measurement report including an interference measurement value associated with at least one of the first set of multiple monitoring occasions, where the update to the search space is based on the interference measurement value. In some examples, the measurement reporting component 955 may be configured as or otherwise support a means for transmitting an indication of a threshold associated with transmission of the measurement report, where receiving the measurement report including the interference measurement value associated with the at least one of the first set of multiple monitoring occasions is based on the interference measurement value exceeding the threshold.

In some examples, the measurement reporting component 955 may be configured as or otherwise support a means for transmitting, to the first UE, a periodic transmission schedule for the measurement report, where receiving the measurement report is based on the periodic transmission schedule. In some examples, the signaling indicating the update to the search space is transmitted via a second part of SCI or a sidelink data channel. In some examples, the update to the search space applies to one or both of a forward link or a reverse link.

Figure 10:
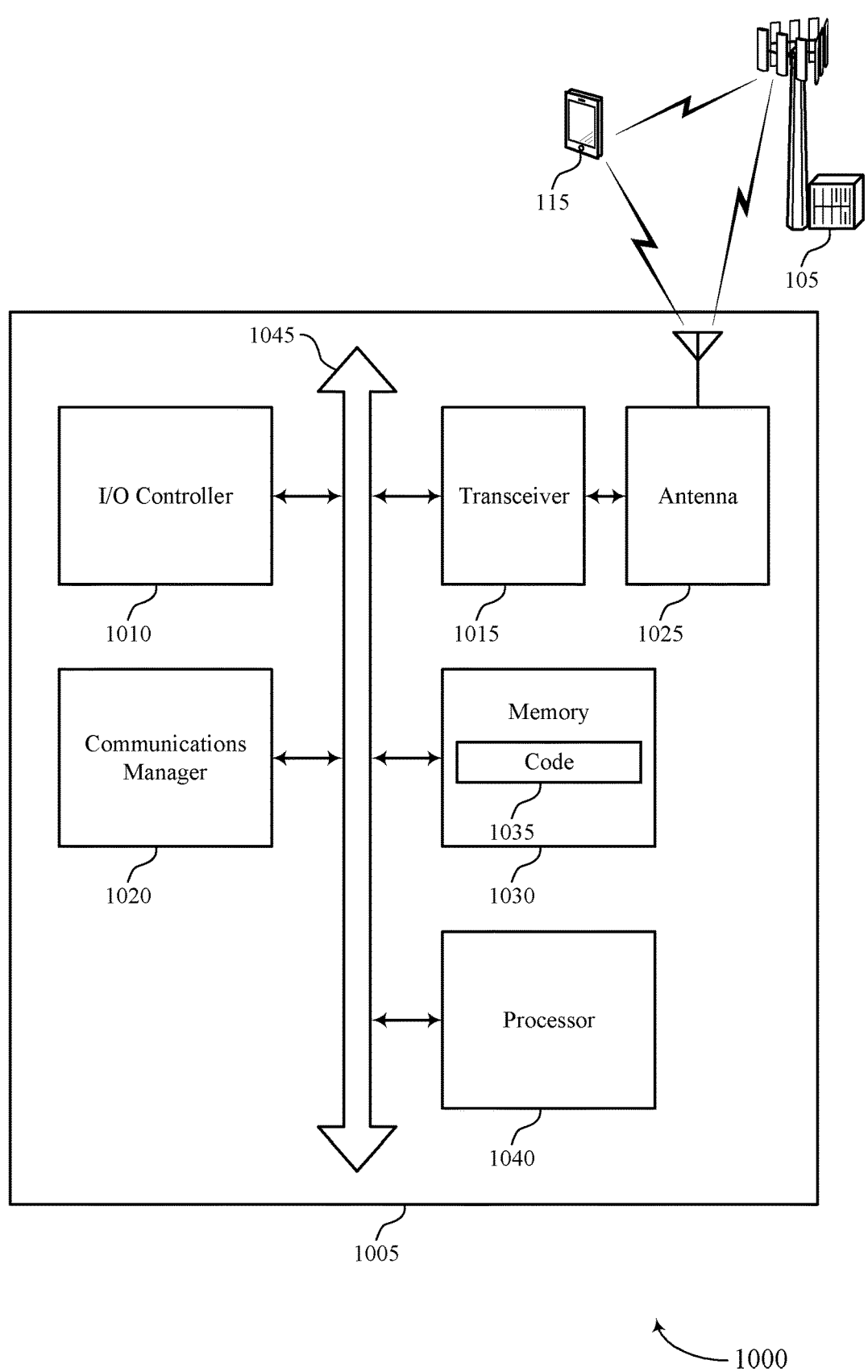
FIG. 10 shows a diagram of a system including a device that supports techniques for dynamically updating a search space of a sidelink control channel in accordance with aspects of the present disclosure.

FIG. 10 shows a diagram of a system 1000 including a device 1005 that supports techniques for dynamically updating a search space of a sidelink control channel in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for dynamically updating a search space of a sidelink control channel). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a first UE in accordance with examples as disclosed herein. For example, the communications manager 1020 may be configured as or otherwise support a means for receiving a configuration of a search space for the first UE including a first set of multiple monitoring occasions of a sidelink control channel. The communications manager 1020 may be configured as or otherwise support a means for receiving, from a second UE, signaling indicating an update to the search space, the update associated with one or more monitoring occasions of the sidelink control channel. The communications manager 1020 may be configured as or otherwise support a means for monitoring a second set of multiple monitoring occasions of the sidelink control channel based on the configuration of the search space and the update to the search space. The communications manager 1020 may be configured as or otherwise support a means for receiving a first part of SCI based on the monitoring.

Additionally or alternatively, the communications manager 1020 may support wireless communication at a second UE in accordance with examples as disclosed herein. For example, the communications manager 1020 may be configured as or otherwise support a means for identifying a configuration of a search space for a first UE including a first set of multiple monitoring occasions of a sidelink control channel. The communications manager 1020 may be configured as or otherwise support a means for transmitting, to the first UE, signaling indicating an update to the search space, the update associated with one or more monitoring occasions of the sidelink control channel. The communications manager 1020 may be configured as or otherwise support a means for transmitting, to the first UE, a first part of SCI over a subset of a second set of multiple monitoring occasions of the sidelink control channel based on the configuration of the search space and the update to the search space.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for dynamically updating a search space of a sidelink control channel as described herein, or the processor 1040 and the memory 1030 may be otherwise configured to perform or support such operations.

Figure 11:
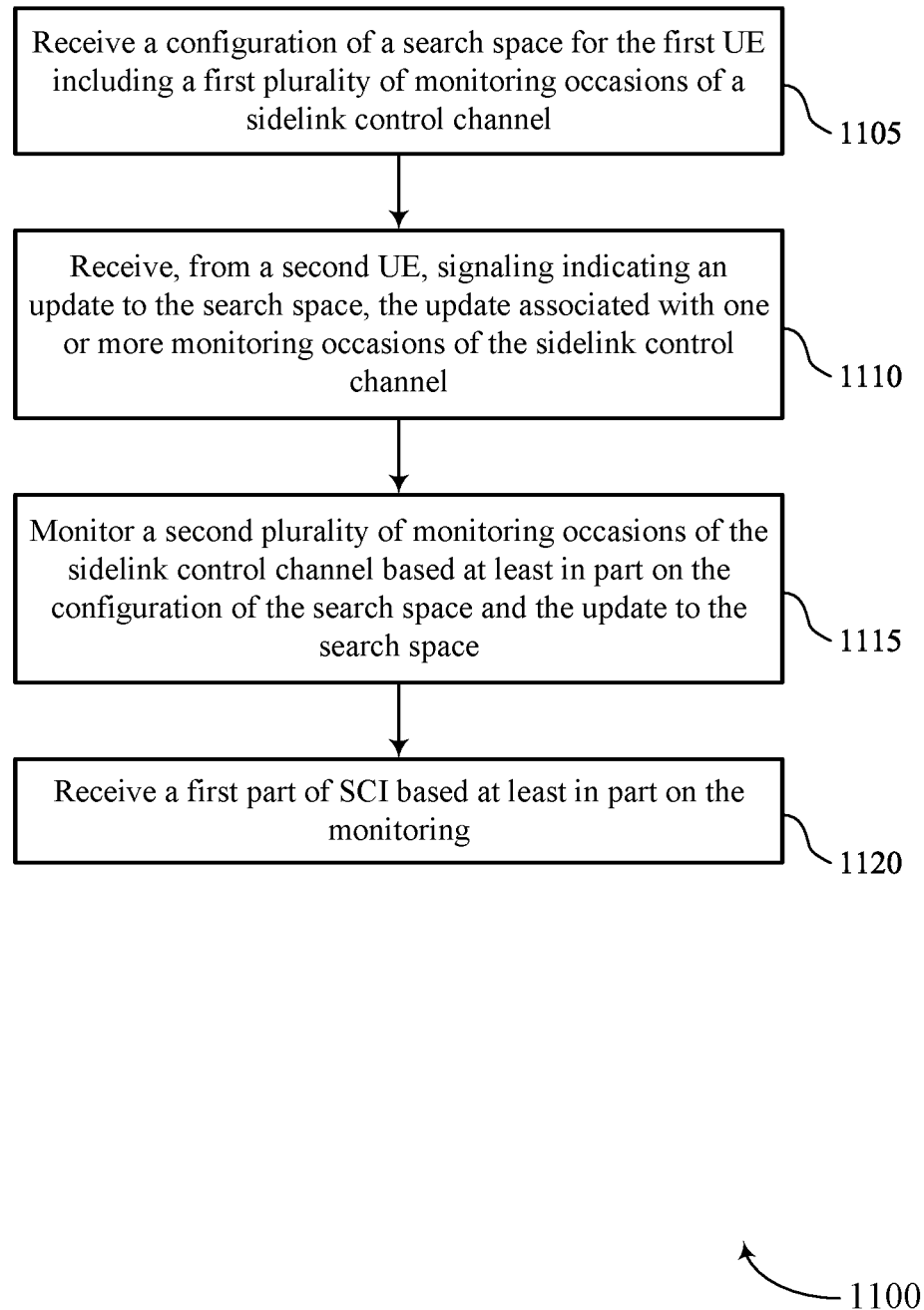
FIGS. 11 through 14 show flowcharts illustrating methods that support techniques for dynamically updating a search space of a sidelink control channel in accordance with aspects of the present disclosure.

FIG. 11 shows a flowchart illustrating a method 1100 that supports techniques for dynamically updating a search space of a sidelink control channel in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include receiving a configuration of a search space for the first UE including a first set of multiple monitoring occasions of a sidelink control channel. The operations of 1105 may be performed in accordance with examples as disclosed herein. In some examples, aspects of the operations of 1105 may be performed by a search space configuration component 925 as described with reference to FIG. 9.

At 1110, the method may include receiving, from a second UE, signaling indicating an update to the search space, the update associated with one or more monitoring occasions of the sidelink control channel. The operations of 1110 may be performed in accordance with examples as disclosed herein. In some examples, aspects of the operations of 1110 may be performed by a search space update component 930 as described with reference to FIG. 9.

At 1115, the method may include monitoring a second set of multiple monitoring occasions of the sidelink control channel based on the configuration of the search space and the update to the search space. The operations of 1115 may be performed in accordance with examples as disclosed herein. In some examples, aspects of the operations of 1115 may be performed by a monitoring component 935 as described with reference to FIG. 9.

At 1120, the method may include receiving a first part of SCI based on the monitoring. The operations of 1120 may be performed in accordance with examples as disclosed herein. In some examples, aspects of the operations of 1120 may be performed by an SCI component 940 as described with reference to FIG. 9.

Figure 12:
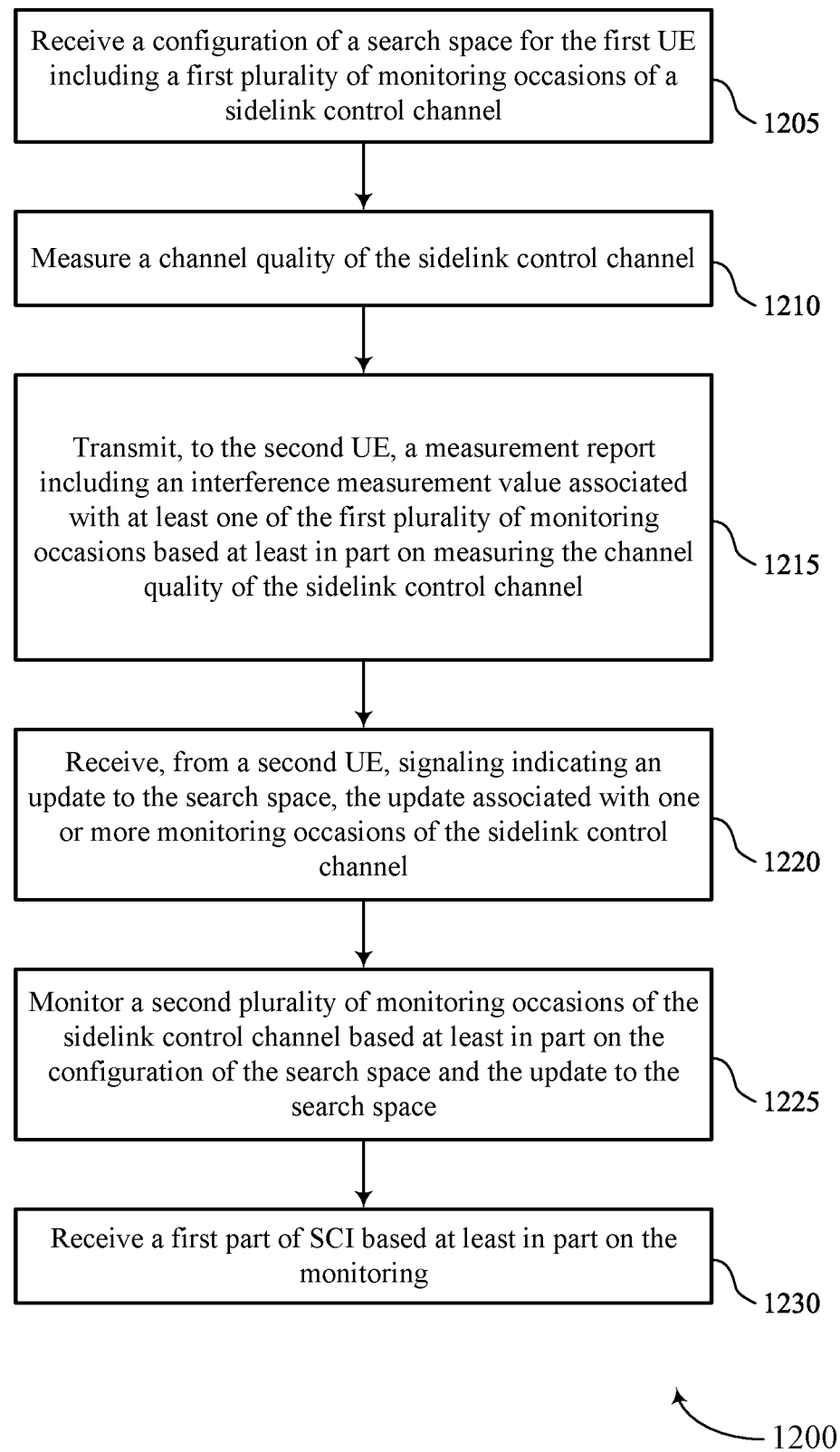

FIG. 12 shows a flowchart illustrating a method 1200 that supports techniques for dynamically updating a search space of a sidelink control channel in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include receiving a configuration of a search space for the first UE including a first set of multiple monitoring occasions of a sidelink control channel. The operations of 1205 may be performed in accordance with examples as disclosed herein. In some examples, aspects of the operations of 1205 may be performed by a search space configuration component 925 as described with reference to FIG. 9.

At 1210, the method may include measuring a channel quality of the sidelink control channel. The operations of 1210 may be performed in accordance with examples as disclosed herein. In some examples, aspects of the operations of 1210 may be performed by a channel measurement component 950 as described with reference to FIG. 9.

At 1215, the method may include transmitting, to the second UE, a measurement report including an interference measurement value associated with at least one of the first set of multiple monitoring occasions based on measuring the channel quality of the sidelink control channel. The operations of 1215 may be performed in accordance with examples as disclosed herein. In some examples, aspects of the operations of 1215 may be performed by a measurement reporting component 955 as described with reference to FIG. 9.

At 1220, the method may include receiving, from a second UE, signaling indicating an update to the search space, the update associated with one or more monitoring occasions of the sidelink control channel. The operations of 1220 may be performed in accordance with examples as disclosed herein. In some examples, aspects of the operations of 1220 may be performed by a search space update component 930 as described with reference to FIG. 9.

At 1225, the method may include monitoring a second set of multiple monitoring occasions of the sidelink control channel based on the configuration of the search space and the update to the search space. The operations of 1225 may be performed in accordance with examples as disclosed herein. In some examples, aspects of the operations of 1225 may be performed by a monitoring component 935 as described with reference to FIG. 9.

At 1230, the method may include receiving a first part of SCI based on the monitoring. The operations of 1230 may be performed in accordance with examples as disclosed herein.

In some examples, aspects of the operations of 1230 may be performed by an SCI component 940 as described with reference to FIG. 9.

Figure 13:
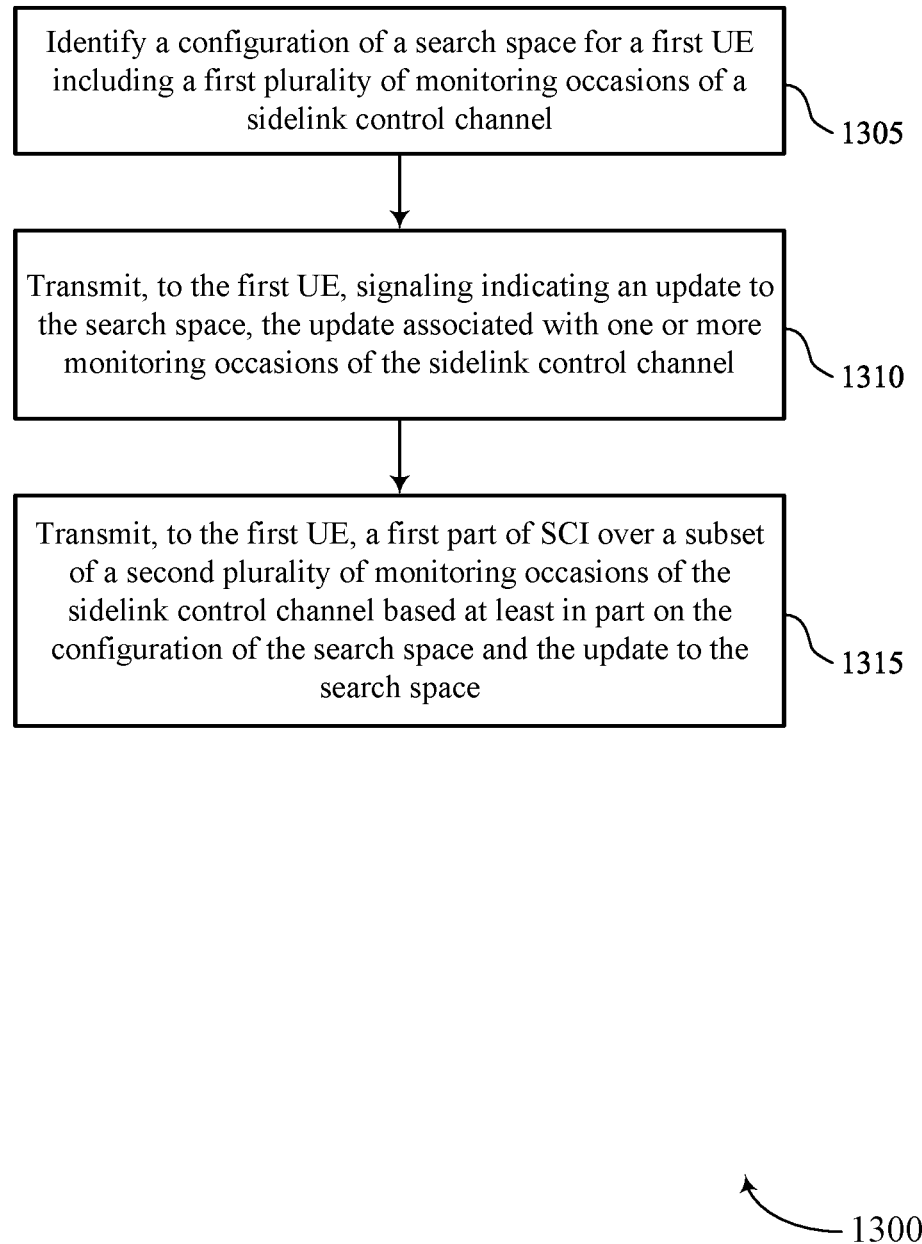

FIG. 13 shows a flowchart illustrating a method 1300 that supports techniques for dynamically updating a search space of a sidelink control channel in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include identifying a configuration of a search space for a first UE including a first set of multiple monitoring occasions of a sidelink control channel. The operations of 1305 may be performed in accordance with examples as disclosed herein. In some examples, aspects of the operations of 1305 may be performed by a search space configuration component 925 as described with reference to FIG. 9.

At 1310, the method may include transmitting, to the first UE, signaling indicating an update to the search space, the update associated with one or more monitoring occasions of the sidelink control channel. The operations of 1310 may be performed in accordance with examples as disclosed herein. In some examples, aspects of the operations of 1310 may be performed by a search space update component 930 as described with reference to FIG. 9.

At 1315, the method may include transmitting, to the first UE, a first part of SCI over a subset of a second set of multiple monitoring occasions of the sidelink control channel based on the configuration of the search space and the update to the search space. The operations of 1315 may be performed in accordance with examples as disclosed herein. In some examples, aspects of the operations of 1315 may be performed by an SCI component 940 as described with reference to FIG. 9.

Figure 14:
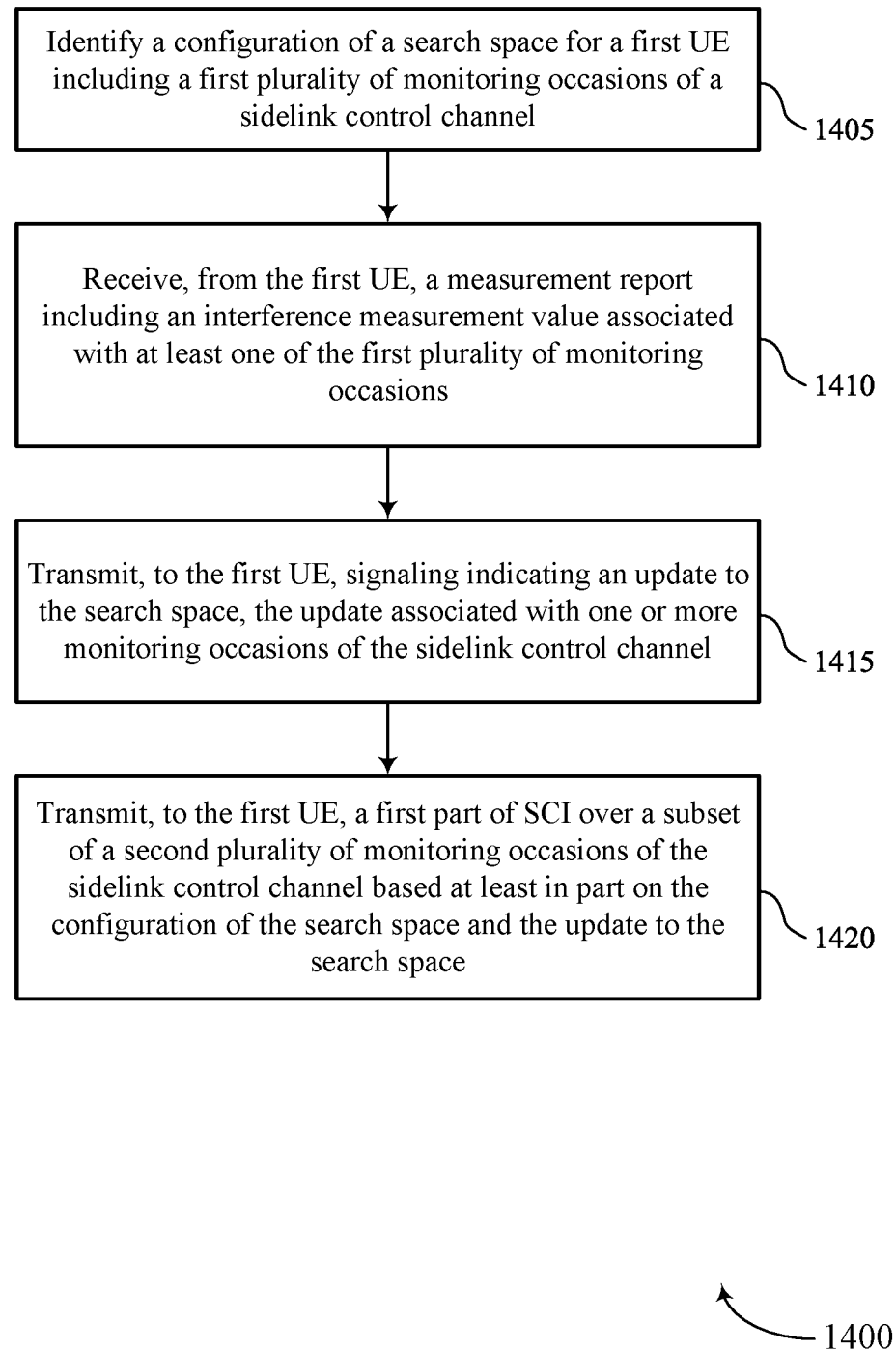

FIG. 14 shows a flowchart illustrating a method 1400 that supports techniques for dynamically updating a search space of a sidelink control channel in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include identifying a configuration of a search space for a first UE including a first set of multiple monitoring occasions of a sidelink control channel. The operations of 1405 may be performed in accordance with examples as disclosed herein. In some examples, aspects of the operations of 1405 may be performed by a search space configuration component 925 as described with reference to FIG. 9.

At 1410, the method may include receiving, from the first UE, a measurement report including an interference measurement value associated with at least one of the first set of multiple monitoring occasions. The operations of 1410 may be performed in accordance with examples as disclosed herein. In some examples, aspects of the operations of 1410 may be performed by a measurement reporting component 955 as described with reference to FIG. 9.

At 1415, the method may include transmitting, to the first UE, signaling indicating an update to the search space, the update associated with one or more monitoring occasions of the sidelink control channel. The operations of 1415 may be performed in accordance with examples as disclosed herein. In some examples, aspects of the operations of 1415 may be performed by a search space update component 930 as described with reference to FIG. 9.

At 1420, the method may include transmitting, to the first UE, a first part of SCI over a subset of a second set of multiple monitoring occasions of the sidelink control channel based on the configuration of the search space and the update to the search space. The operations of 1420 may be performed in accordance with examples as disclosed herein. In some examples, aspects of the operations of 1420 may be performed by an SCI component 940 as described with reference to FIG. 9.

The following provides an overview of aspects of the present disclosure:

Aspect 1: A method for wireless communication at a first UE, comprising: receiving a configuration of a search space for the first UE including a first plurality of monitoring occasions of a sidelink control channel; receiving, from a second UE, signaling indicating an update to the search space, the update associated with one or more monitoring occasions of the sidelink control channel; monitoring a second plurality of monitoring occasions of the sidelink control channel based at least in part on the configuration of the search space and the update to the search space; and receiving a first part of SCI based at least in part on the monitoring.

Aspect 2: The method of aspect 1, wherein receiving the signaling indicating the update to the search space comprises: receiving an indication of a blocking, from the search space, of the one or more monitoring occasions of the sidelink control channel, wherein the second plurality of monitoring occasions comprises a difference between the first plurality of monitoring occasions and the one or more monitoring occasions.

Aspect 3: The method of any of aspects 1 through 2, wherein receiving the signaling indicating the update to the search space comprises: receiving an indication of an addition, to the search space, of the one or more monitoring occasions of the sidelink control channel, wherein the second plurality of monitoring occasions comprises a sum of the first plurality of monitoring occasions and the one or more monitoring occasions.

Aspect 4: The method of any of aspects 1 through 3, wherein receiving the signaling indicating the update to the search space comprises: receiving an indication of a reactivation of the one or more monitoring occasions of the sidelink control channel, wherein the second plurality of monitoring occasions comprises at least the one or more monitoring occasions.

Aspect 5: The method of aspect 1, wherein the first UE is configured with a set of search spaces including at least two search spaces, and wherein receiving the configuration of the search space comprises receiving a first indication of a first search space of the set of search spaces; and receiving the signaling indicating the update to the search space comprises receiving a second indication of a switch from the first search space to a second search space of the set of search spaces.

Aspect 6: The method of aspect 5, wherein the first search space is associated with a first monitoring occasion blocking pattern and the second search space is associated with a second monitoring occasion blocking pattern.

Aspect 7: The method of any of aspects 1 through 6, wherein receiving the signaling indicating the update to the search space comprises: receiving a timer indicating a suspension of the update to the search space, wherein the update to the search space is valid for a duration of the timer and invalid upon expiration of the timer.

Aspect 8: The method of any of aspects 1 through 7, wherein receiving the signaling indicating the update to the search space comprises: receiving an offset indicating a time to apply the update to the search space.

Aspect 9: The method of any of aspects 1 through 8, further comprising: transmitting, to the second UE, an acknowledgement of the signaling indicating the update to the search space.

Aspect 10: The method of any of aspects 1 through 9, further comprising: measuring a channel quality of the sidelink control channel; and transmitting, to the second UE, a measurement report including an interference measurement value associated with at least one of the first plurality of monitoring occasions based at least in part on measuring the channel quality of the sidelink control channel, wherein the update to the search space is based at least in part on the interference measurement value.

Aspect 11: The method of aspect 10, further comprising: receiving an indication of a threshold associated with transmission of the measurement report, wherein transmitting the measurement report including the interference measurement value associated with the at least one of the first plurality of monitoring occasions is based at least in part on the interference measurement value exceeding the threshold.

Aspect 12: The method of any of aspects 10 through 11, further comprising: receiving, from the second UE, a periodic transmission schedule for the measurement report, wherein transmitting the measurement report is based at least in part on the periodic transmission schedule.

Aspect 13: The method of any of aspects 1 through 12, wherein the signaling indicating the update to the search space is received via a second part of SCI or a sidelink data channel.

Aspect 14: The method of any of aspects 1 through 13, wherein the update to the search space applies to one or both of a forward link or a reverse link.

Aspect 15: A method for wireless communication at a second UE, comprising: identifying a configuration of a search space for a first UE including a first plurality of monitoring occasions of a sidelink control channel; transmitting, to the first UE, signaling indicating an update to the search space, the update associated with one or more monitoring occasions of the sidelink control channel; and transmitting, to the first UE, a first part of SCI over a subset of a second plurality of monitoring occasions of the sidelink control channel based at least in part on the configuration of the search space and the update to the search space.

Aspect 16: The method of aspect 15, wherein transmitting the signaling indicating the update to the search space comprises: transmitting an indication of a blocking, from the search space, of the one or more monitoring occasions of the sidelink control channel, wherein the second plurality of monitoring occasions comprises a difference between the first plurality of monitoring occasions and the one or more monitoring occasions.

Aspect 17: The method of any of aspects 15 through 16, wherein transmitting the signaling indicating the update to the search space comprises: transmitting an indication of an addition, to the search space, of the one or more monitoring occasions of the sidelink control channel, wherein the second plurality of monitoring occasions comprises a sum of the first plurality of monitoring occasions and the one or more monitoring occasions.

Aspect 18: The method of any of aspects 15 through 17, wherein transmitting the signaling indicating the update to the search space comprises: transmitting an indication of a reactivation of the one or more monitoring occasions of the sidelink control channel, wherein the second plurality of monitoring occasions comprises at least the one or more monitoring occasions.

Aspect 19: The method of aspect 15, wherein the first UE is configured with a set of search spaces including at least two search spaces, and wherein the method further comprises transmitting, to the first UE, a first indication of a first search space of the set of search spaces; and transmitting the signaling indicating the update to the search space comprises transmitting a second indication of a switch from the first search space to a second search space of the set of search spaces.

Aspect 20: The method of aspect 19, wherein the first search space is associated with a first monitoring occasion blocking pattern and the second search space is associated with a second monitoring occasion blocking pattern.

Aspect 21: The method of any of aspects 15 through 20, wherein transmitting the signaling indicating the update to the search space comprises: transmitting a timer indicating a suspension of the update to the search space, wherein the update to the search space is valid for a duration of the timer and invalid upon expiration of the timer.

Aspect 22: The method of any of aspects 15 through 21, wherein transmitting the signaling indicating the update to the search space comprises: transmitting an offset indicating a time to apply the update to the search space.

Aspect 23: The method of any of aspects 15 through 22, further comprising: receiving, from the first UE, an acknowledgement of the signaling indicating the update to the search space.

Aspect 24: The method of any of aspects 15 through 23, further comprising: receiving, from the first UE, a measurement report including an interference measurement value associated with at least one of the first plurality of monitoring occasions, wherein the update to the search space is based at least in part on the interference measurement value.

Aspect 25: The method of aspect 24, further comprising: transmitting an indication of a threshold associated with transmission of the measurement report, wherein receiving the measurement report including the interference measurement value associated with the at least one of the first plurality of monitoring occasions is based at least in part on the interference measurement value exceeding the threshold.

Aspect 26: The method of any of aspects 24 through 25, further comprising: transmitting, to the first UE, a periodic transmission schedule for the measurement report, wherein receiving the measurement report is based at least in part on the periodic transmission schedule.

Aspect 27: The method of any of aspects 15 through 26, wherein the signaling indicating the update to the search space is transmitted via a second part of SCI or a sidelink data channel.

Aspect 28: The method of any of aspects 15 through 27, wherein the update to the search space applies to one or both of a forward link or a reverse link.

Aspect 29: An apparatus for wireless communication at a first UE, comprising a processor; memory coupled with the processor; and instructions stored in the memory and executable by the processor to cause the apparatus to perform a method of any of aspects 1 through 14.

Aspect 30: An apparatus for wireless communication at a first UE, comprising at least one means for performing a method of any of aspects 1 through 14.

Aspect 31: A non-transitory computer-readable medium storing code for wireless communication at a first UE, the code comprising instructions executable by a processor to perform a method of any of aspects 1 through 14.

Aspect 32: An apparatus for wireless communication at a second UE, comprising a processor; memory coupled with the processor; and instructions stored in the memory and executable by the processor to cause the apparatus to perform a method of any of aspects 15 through 28.

Aspect 33: An apparatus for wireless communication at a second UE, comprising at least one means for performing a method of any of aspects 15 through 28.

Aspect 34: A non-transitory computer-readable medium storing code for wireless communication at a second UE, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving, from a network device or a second UE, a configuration of a search space for the first UE including a first plurality of monitoring occasions of a sidelink control channel;
   receiving, from the second UE via a sidelink data channel, signaling indicating an update to the search space, the update associated with one or more monitoring occasions of the sidelink control channel;
   monitoring a second plurality of monitoring occasions of the sidelink control channel based at least in part on the configuration of the search space and the update to the search space; and
   receiving, from the second UE, a first part of sidelink control information based at least in part on the monitoring.

2. The method of claim 1, wherein receiving the signaling indicating the update to the search space comprises:
   receiving an indication of a blocking, from the search space, of the one or more monitoring occasions of the sidelink control channel, wherein the second plurality of monitoring occasions comprises a difference between the first plurality of monitoring occasions and the one or more monitoring occasions.

3. The method of claim 1, wherein receiving the signaling indicating the update to the search space comprises:
   receiving an indication of an addition, to the search space, of the one or more monitoring occasions of the sidelink control channel, wherein the second plurality of monitoring occasions comprises a sum of the first plurality of monitoring occasions and the one or more monitoring occasions.

4. The method of claim 1, wherein receiving the signaling indicating the update to the search space comprises:
   receiving an indication of a reactivation of the one or more monitoring occasions of the sidelink control channel, wherein the second plurality of monitoring occasions comprises at least the one or more monitoring occasions.

5. The method of claim 1, wherein the first UE is configured with a set of search spaces including at least two search spaces, and wherein:
   receiving the configuration of the search space comprises receiving a first indication of a first search space of the set of search spaces; and
   receiving the signaling indicating the update to the search space comprises receiving a second indication of a switch from the first search space to a second search space of the set of search spaces.

6. The method of claim 5, wherein the first search space is associated with a first monitoring occasion blocking pattern and the second search space is associated with a second monitoring occasion blocking pattern.

7. The method of claim 1, wherein receiving the signaling indicating the update to the search space comprises:
   receiving a timer indicating a suspension of the update to the search space, wherein the update to the search space is valid for a duration of the timer and invalid upon expiration of the timer.

8. The method of claim 1, wherein receiving the signaling indicating the update to the search space comprises:
   receiving an offset indicating a time to apply the update to the search space.

9. The method of claim 1, further comprising:
   transmitting, to the second UE, an acknowledgement of the signaling indicating the update to the search space.

10. The method of claim 1, further comprising:
    measuring a channel quality of the sidelink control channel; and
    transmitting, to the second UE, a measurement report including an interference measurement value associated with at least one of the first plurality of monitoring occasions based at least in part on measuring the channel quality of the sidelink control channel, wherein the update to the search space is based at least in part on the interference measurement value.

11. The method of claim 10, further comprising:
    receiving an indication of a threshold associated with transmission of the measurement report, wherein transmitting the measurement report including the interference measurement value associated with the at least one of the first plurality of monitoring occasions is based at least in part on the interference measurement value exceeding the threshold.

12. The method of claim 10, further comprising:
    receiving, from the second UE, a periodic transmission schedule for the measurement report, wherein transmitting the measurement report is based at least in part on the periodic transmission schedule.

13. The method of claim 1, wherein the signaling indicating the update to the search space is received via a second part of sidelink control information.

14. The method of claim 1, wherein the update to the search space applies to one or both of a forward link or a reverse link.

15. A method for wireless communication at a second user equipment (UE), comprising:
    identifying a configuration of a search space for a first UE including a first plurality of monitoring occasions of a sidelink control channel;
    transmitting, to the first UE via a sidelink data channel, signaling indicating an update to the search space, the update associated with one or more monitoring occasions of the sidelink control channel; and
    transmitting, to the first UE, a first part of sidelink control information over a subset of a second plurality of monitoring occasions of the sidelink control channel based at least in part on the configuration of the search space and the update to the search space.

16. The method of claim 15, wherein transmitting the signaling indicating the update to the search space comprises:
    transmitting an indication of a blocking, from the search space, of the one or more monitoring occasions of the sidelink control channel, wherein the second plurality of monitoring occasions comprises a difference between the first plurality of monitoring occasions and the one or more monitoring occasions.

17. The method of claim 15, wherein transmitting the signaling indicating the update to the search space comprises:
transmitting an indication of an addition, to the search space, of the one or more monitoring occasions of the sidelink control channel, wherein the second plurality of monitoring occasions comprises a sum of the first plurality of monitoring occasions and the one or more monitoring occasions.

18. The method of claim 15, wherein transmitting the signaling indicating the update to the search space comprises:
transmitting an indication of a reactivation of the one or more monitoring occasions of the sidelink control channel, wherein the second plurality of monitoring occasions comprises at least the one or more monitoring occasions.

19. The method of claim 15, wherein the first UE is configured with a set of search spaces including at least two search spaces, and wherein:
the method further comprises transmitting, to the first UE, a first indication of a first search space of the set of search spaces; and
transmitting the signaling indicating the update to the search space comprises transmitting a second indication of a switch from the first search space to a second search space of the set of search spaces.

20. The method of claim 19, wherein the first search space is associated with a first monitoring occasion blocking pattern and the second search space is associated with a second monitoring occasion blocking pattern.

21. The method of claim 15, wherein transmitting the signaling indicating the update to the search space comprises:
transmitting a timer indicating a suspension of the update to the search space, wherein the update to the search space is valid for a duration of the timer and invalid upon expiration of the timer.

22. The method of claim 15, wherein transmitting the signaling indicating the update to the search space comprises:
transmitting an offset indicating a time to apply the update to the search space.

23. The method of claim 15, further comprising:
receiving, from the first UE, an acknowledgement of the signaling indicating the update to the search space.

24. The method of claim 15, further comprising:
receiving, from the first UE, a measurement report including an interference measurement value associated with at least one of the first plurality of monitoring occasions, wherein the update to the search space is based at least in part on the interference measurement value.

25. The method of claim 24, further comprising:
transmitting an indication of a threshold associated with transmission of the measurement report, wherein receiving the measurement report including the interference measurement value associated with the at least one of the first plurality of monitoring occasions is based at least in part on the interference measurement value exceeding the threshold.

26. The method of claim 24, further comprising:
transmitting, to the first UE, a periodic transmission schedule for the measurement report, wherein receiving the measurement report is based at least in part on the periodic transmission schedule.

27. The method of claim 15, wherein the signaling indicating the update to the search space is transmitted via a second part of sidelink control information.

28. The method of claim 15, wherein the update to the search space applies to one or both of a forward link or a reverse link.

29. An apparatus for wireless communication at a first user equipment (UE), comprising:
a processor;
memory coupled with the processor; and
instructions stored in the memory and executable by the processor to cause the apparatus to:
receive, from a network device or a second UE, a configuration of a search space for the first UE including a first plurality of monitoring occasions of a sidelink control channel;
receive, from the second UE via a sidelink data channel, signaling indicating an update to the search space, the update associated with one or more monitoring occasions of the sidelink control channel;
monitor a second plurality of monitoring occasions of the sidelink control channel based at least in part on the configuration of the search space and the update to the search space; and
receive, from the second UE, a first part of sidelink control information based at least in part on the monitoring.

30. An apparatus for wireless communication at a second user equipment (UE), comprising:
a processor;
memory coupled with the processor; and
instructions stored in the memory and executable by the processor to cause the apparatus to:
identify a configuration of a search space for a first UE including a first plurality of monitoring occasions of a sidelink control channel;
transmit, to the first UE via a sidelink data channel, signaling indicating an update to the search space, the update associated with one or more monitoring occasions of the sidelink control channel; and
transmit, to the first UE, a first part of sidelink control information over a subset of a second plurality of monitoring occasions of the sidelink control channel based at least in part on the configuration of the search space and the update to the search space.

* * * * *